(12) United States Patent
Xu et al.

(10) Patent No.: US 10,594,414 B2
(45) Date of Patent: Mar. 17, 2020

(54) ELECTRON DEVICE AND WIRELESS COMMUNICATION METHOD IN WIRELESS COMMUNICATION SYSTEM

(71) Applicant: SONY CORPORATION, Tokyo (JP)

(72) Inventors: Xiaodong Xu, Beijing (CN); Mingyang Li, Beijing (CN); Yang Liu, Beijing (CN); Xi Ke, Beijing (CN); Yi Zhang, Beijing (CN); Xinchen Lv, Beijing (CN)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/568,565

(22) PCT Filed: Apr. 27, 2016

(86) PCT No.: PCT/CN2016/080336
§ 371 (c)(1),
(2) Date: Oct. 23, 2017

(87) PCT Pub. No.: WO2016/173494
PCT Pub. Date: Nov. 3, 2016

(65) Prior Publication Data
US 2018/0159641 A1 Jun. 7, 2018

(30) Foreign Application Priority Data
Apr. 30, 2015 (CN) .......................... 2015 1 0218007

(51) Int. Cl.
*H04B 17/27* (2015.01)
*H04W 64/00* (2009.01)
*H04W 84/04* (2009.01)

(52) U.S. Cl.
CPC ............ *H04B 17/27* (2015.01); *H04W 64/00* (2013.01); *H04W 84/045* (2013.01)

(58) Field of Classification Search
CPC ... H04L 5/0048; H04L 5/0053; H04L 5/0007; H04L 5/005; H04L 5/00; H04L 5/0051;
(Continued)

(56) References Cited

U.S. PATENT DOCUMENTS

| 8,654,727 B2 | 2/2014 | Dai et al. |
| 2012/0093101 A1 | 4/2012 | Dai et al. |

(Continued)

FOREIGN PATENT DOCUMENTS

| CN | 101616360 A | 12/2009 |
| WO | 2014/181850 A2 | 11/2014 |
| WO | 2015/043503 A1 | 4/2015 |

OTHER PUBLICATIONS

Design target for discovery enhancement; 3GPP TSG RAN WG1 Meeting #75; R1-135381; San Francisco, USA, Nov. 11-15, 2013, Huawei, HiSilicon (Year: 2013).*
(Continued)

*Primary Examiner* — Christopher M Brandt
*Assistant Examiner* — Jing Gao
(74) *Attorney, Agent, or Firm* — Xsensus LLP

(57) ABSTRACT

An electron device and a wireless communication method in a wireless communication system. The electron device includes one or more processing circuits configured to execute: determining positioning measurement assistant data for a user device, the assistant data including configuration information of an enhanced Discovery Reference Signal (eDRS) sent from at least one sleeping small cell base station; executing positioning measurement on the eDRS sent from at least one sleeping small cell base station on the basis of the assistant data; and generating positioning information on the basis of the result of positioning measurement on the eDRS sent from at least one sleeping small cell base station, so as to position the user device, the eDRS having (Continued)

greater transmitting power than a Discovery Reference Signal DRS.

9 Claims, 11 Drawing Sheets

(58) Field of Classification Search
CPC ... H04L 5/001; H04L 27/2613; H04L 5/0091; H04L 5/0035; H04L 5/1469; H04L 1/1812; H04L 5/0082; H04L 1/0004; H04L 5/0005; H04L 5/006; H04W 24/10; H04W 16/14; H04W 48/16; H04W 72/0446; H04W 74/0808; H04W 88/02; H04W 88/08; H04W 64/00; H04W 72/0406; H04W 74/0816; H04W 56/0005; H04W 72/04; H04W 56/0015; H04W 72/0453; H04W 72/046; H04W 72/085; H04W 28/26; H04W 36/06; H04W 4/02; H04W 4/12; H04B 17/27
See application file for complete search history.

(56) References Cited

U.S. PATENT DOCUMENTS

| | | |
|---|---|---|
| 2015/0092582 A1 | 4/2015 | Liao et al. |
| 2015/0092655 A1 | 4/2015 | Liao et al. |
| 2016/0066291 A1 | 3/2016 | Awad et al. |
| 2016/0195601 A1* | 7/2016 | Siomina ............... G01S 5/0205 455/456.1 |

OTHER PUBLICATIONS

International Search Report dated Jul. 22, 2016 in PCT/CN2016/080336 Filed Apr. 27, 2016.

* cited by examiner

ELECTRON DEVICE AND WIRELESS COMMUNICATION METHOD IN WIRELESS COMMUNICATION SYSTEM

FIELD

The present disclosure relates to the technical field of wireless communication, and in particular to an electronic device in a wireless communication system and a method for performing wireless communication in a wireless communication system.

BACKGROUND

This section provides background information relating to the present disclosure, which is not necessarily prior art.

A Small Cell Network (SCN) is considered as an efficient means in response to rapid increase of data traffic. In discussion of standardization of wireless communication, a new reference signal, a Discovery Reference Signal (DRS), is used to support a small cell on/off mechanism. In an off state of a small cell, a small cell base station transmits only a DRS.

Indoor positioning is one of focal points for the standardization of the wireless communication technology. The conventional Observed Time Difference Of Arrival (OT-DOA) technology is a technology mainly considered for the indoor positioning technology. Since enough accuracy cannot still be achieved by the OTDOA based on only a cell specific reference signal, a Positioning Reference Signal (PRS) is introduced.

However, the small cell does not transmit a PRS in an off state. If the OTDOA is based only the PRS, it results in that when a great number of small cells are in the off state, a positioning accuracy of a user equipment is reduced and even the user equipment cannot be positioned.

Therefore, it is necessary to provide a new wireless communication technology solution, so as to improve the positioning accuracy and accelerate a positioning process.

SUMMARY

This section provides a general summary of the present disclosure, and is not a comprehensive disclosure of its full scope or all of its features.

An object of the present disclosure is to provide an electronic device in a wireless communication system and a method for performing wireless communication in a wireless communication system, such that the small cell on/off technology and the OTDOA technology can be compatible with each other, to improve a positioning accuracy of a user equipment and accelerate a positioning process.

According to an aspect of the present disclosure, an electronic device at a user equipment side is provided, which includes one or more processing circuits, the processing circuits are configured to perform operations of: determining positioning measurement auxiliary data for the user equipment, the auxiliary data including configuration information of an enhanced discovery reference signal eDRS transmitted by at least one sleeping small cell base station; performing positioning measurement on the eDRS transmitted by the at least one sleeping small cell base station based on the auxiliary data; and generating positioning information based on a result of positioning measurement performed on the eDRS transmitted by the at least one sleeping small cell base station to perform positioning on the user equipment, where the eDRS has a greater transmission power than a discovery reference signal DRS.

According to another aspect of the present disclosure, an electronic device at a small cell base station side in a wireless communication system is provided, which includes one or more processing circuits, the processing circuits are configured to perform operations of: determining transmission configuration information of an enhanced discovery reference signal eDRS from a control device; and performing, based on the configuration information, power control on a discovery reference signal DRS of a small cell managed by the small cell base station, to generate the eDRS, where the eDRS has a greater transmission power than the DRS.

According to another aspect of the present disclosure, an electronic device in a wireless communication system is provided, which includes one or more processing circuits, the processing circuits are configured to perform operations of: determining, based on at least one of the number of user equipments to be positioned and positions of the user equipments to be positioned in a predetermined geographical region, whether to activate at least one sleeping small cell base station in the predetermined geographical region to transmit an enhanced discovery reference signal eDRS to perform positioning on the user equipment; and generating transmission configuration information of an eDRS for a corresponding sleeping small cell base station based on a determination result, where the eDRS has a greater transmission power than a discovery reference signal DRS.

According to another aspect of the present disclosure, a method for performing wireless communication in a wireless communication system is provided, which includes: determining positioning measurement auxiliary data for a user equipment, the auxiliary data including configuration information of an enhanced discovery reference signal eDRS transmitted by at least one sleeping small cell base station; performing positioning measurement on the eDRS transmitted by the at least one sleeping small cell base station based on the auxiliary data; and generating positioning information based on a result of positioning measurement performed on the eDRS transmitted by the at least one sleeping small cell base station to perform positioning on the user equipment, where the eDRS has a greater transmission power than a discovery reference signal DRS.

According to another aspect of the present disclosure, a method for performing wireless communication in a wireless communication system is provided, which includes: determining transmission configuration information of an enhanced discovery reference signal eDRS from a control device; and performing, based on the configuration information, power control on a discovery reference signal DRS of a small cell managed by the small cell base station, to generate the eDRS, where the eDRS has a greater transmission power than the DRS.

According to another aspect of the present disclosure, a method for performing wireless communication in a wireless communication system is provided, which includes: determining, based on at least one of the number of user equipments to be positioned and positions of user equipments to be positioned in a predetermined geographical region, whether to activate at least one sleeping small cell base station in the predetermined geographical region to transmit an enhanced discovery reference signal eDRS to perform positioning on the user equipment; and generating transmission configuration information of an eDRS for a corresponding sleeping small cell base station based on a determination result, where the eDRS has a greater transmission power than a discovery reference signal DRS.

With the electronic device in the wireless communication system and the method for performing wireless communication in the wireless communication system according to the present disclosure, an existing DRS signal can be utilized sufficiently and enhanced appropriately, thereby improving a positioning accuracy and accelerating a positioning process.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure. In the drawings.

Figure 1:
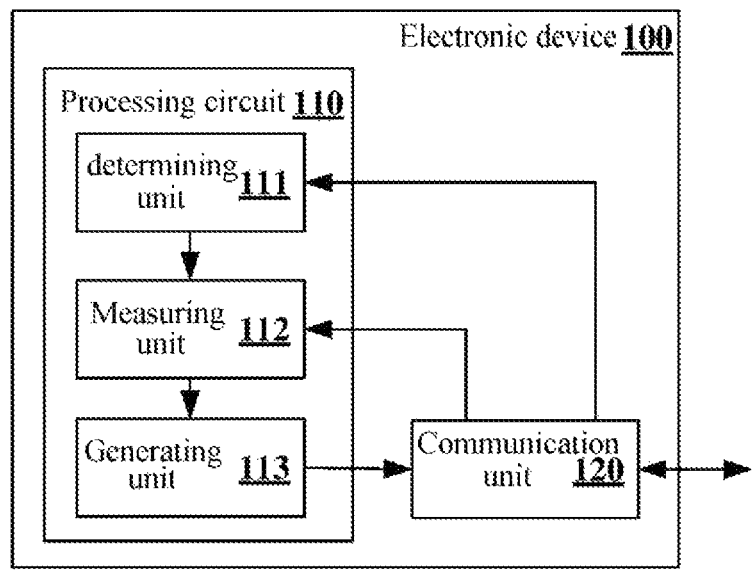
FIG. 1 is a block diagram showing a structure of an electronic device in a wireless communication system according to an embodiment of the present disclosure.

While the present disclosure is susceptible to various modifications and alternative forms, specific embodiments thereof have been shown by way of example in the drawings and are herein described in detail. It should be understood, however, that the description herein of specific embodiments is not intended to limit the present disclosure to the particular forms disclosed, but on the contrary, the intention is to cover all modifications, equivalents, and alternatives falling within the spirit and scope of the present disclosure. Note that corresponding reference numerals indicate corresponding parts throughout the several views of the drawings.

DETAILED DESCRIPTION OF EMBODIMENTS

Examples of the present disclosure will now be described more fully with reference to the accompanying drawings. The following description is merely exemplary in nature and is not intended to limit the present disclosure, application, or uses.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

A User Equipment (UE) involved in the present disclosure includes but not limiting to terminals with a wireless communication function such as a mobile terminal, a computer and a vehicle-mounted device. Further, the UE involved in the present disclosure may be the UE itself or components thereof such as a chip. A base station involved in the present disclosure may be an evolution Node Base Station (eNB) or components in the eNB such as a chip.

Hereinafter the Observed Time Difference Of Arrival (OTDOA) technology known for the inventor is introduced briefly, which is not necessarily prior art.

OTDOA positioning is a downlink positioning mode defined in the Long Term Evolution (LTE) Rel-9. In the OTDOA, the User Equipment (UE) measures Time of Arrival (TOA) of reference signals for multiple base stations, and calculates a TOA difference between a neighboring cell and a reference cell. From the view of geometry, the TOA difference between each neighboring cell and the reference cell may be indicated as a hyperbolic curve in a two dimensional plane. In this case, two hyperbolic curves may be obtained by measuring TOA of reference signals for at least three base stations, thereby obtaining a two dimensional coordinate position of the UE (longitude and latitude).

The OTDOA is performed based on a reference signal time difference of a neighboring cell and a service cell observed the UE, which is referred to as a Reference Signal Time Difference (RSTD).

However, a downlink signal transmitted by the neighboring cell generally has poor "audibility" for a UE beyond a service range of the neighboring cell, thereby severely influencing a positioning accuracy and a positioning success rate of the OTDOA.

For example, a synchronization signal of the neighboring cell (such as Primary Synchronization Signal (PSS) or Secondary Synchronization Signal (SSS)) may be utilized for measurement, but it is difficult for the UE to detect enough neighboring cells to perform accurate positioning.

Therefore, in order to increase a probability that the UE detects the neighboring cell, such that good positioning reliability can be obtained by the OTDOA, a Positioning Reference Signal (PRS) is defined specially in the LTE Rel-9.

There are many similarities between the PRS and Cell-specific reference signal (CRS) defined in the LTE Rel-8. The PRS uses a pseudo random Quadrature Phase Shift Keying (QPSK) sequence, and is mapped into a diagonal shape by staggering of time and frequencies, so as to avoid collision with the CRS. The PRS signal can be transmitted at only a port 6 of an antenna, and cannot be mapped onto resource blocks occupied by a Physical Broadcast Channel (PBCH), the PSS and the SSS. A bandwidth of the PRS is defined as 15 kHz.

Downlink Energy Per Resource Element (EPRE) is maintained as a constant on the bandwidth of the PRS. Power Offset is used to indicate a transmission power difference of the PRS and the CRS and adjust a transmission power of the PRS on each resource block.

A core network element of the OTDOA positioning method is a Location Server (LS). In Control Plane (CP) positioning, the location server plays a role of an Evolved Serving Mobile Location Center (E-SMLC). In User Plane (UP) positioning, the location server functions as an SUPL (Secure User Plane Location) Location Platform (SLP) for SUPL.

A Gateway Mobile Location Center (GMLC) is a first node for accessing the control plane positioning by an external client device. After registration and authorization, the GMLC transmits a positioning request to a Mobility Management Entity (MME) and receives a final positioning result estimation from the MME.

The location server transmits positioning auxiliary data to the UE, and the UE reports an RSTD measurement result to the location server, such that the location sever completes OTDOA positioning on a terminal device. The location server may further calculate (the UE assisting) or verify (based on the UE) the final position estimation.

In the control plane solution, the MME receives a positioning service request on a specific UE from another entity (such as a GMLC and a UE), or the MME itself initiates positioning initialization for a specific UE. Then, the MME transmits a positioning service request to the E-SMLC, and the E-SMLC processes the positioning service request and transmits OTDOA positioning auxiliary data to a target UE. Subsequently, the E-SMLC then returns information of the positioning service result to the MME. If the positioning service request is not initialized by the MME, the MME transmits the positioning result to an entity initializing the request.

The SLP is an SUPL entity configured to perform plane positioning of a user, and the SLP directly communicates with the UE by bearing data on a user plane. The SLP has a same function as that of the E-SMLC in the OTDOA positioning flow.

A positioning protocol flow between the location servers (the E-SMLC or the SUPL SLP) generally includes three parts: bearer transfer; auxiliary data transfer; and positioning information transfer.

The OTDOA technology has been introduced above. Subsequently, the small cell on/off technology known for the inventor is briefly introduced, which is not necessarily prior art.

Due to dense deployment of small cells, synchronization signals and reference signals between cells are interfered severely. For the small cell on/off technology, it needs a more effective cell discovery mechanism to reduce conversion time of the small cell on/off, therefore the 3GPP proposes to design a new reference signal, a Discovery Reference Signal (DRS). Meanwhile, the DRS is beneficial to achieve load balance, interference coordination, Radio Resource Management (RRM) measurement and cell identification between dense small cells. It follows that, the DRS will generate a series of beneficial effects.

The DRS signal mainly includes PSS/SSS and CRS, and whether the channel state information reference signal (CSI-RS) is included in the DRS are determined as follows.

If a measurement report on Reference Signal Receiving Power (RSRP)/Reference Signal Receiving Quality (RSRQ) based on CSI-RS is configured, the DRS includes PSS/SSS, CRS and CSI-RS.

If a measurement report on RSRP/RSRQ based on CRS is configured, the DRS includes PSSS/SSS and CRS.

If both the two reports are configured, the DRS includes PSS/SSS, CRS and CSI-RS.

In addition, for intra-frequency and inter-frequency measurement, if the UE configures only the measurement report based on DRS in a given frequency and the UE is not configured to any activated service cell in the frequency, the UE concerns only the DRS and neglects existence of any other signal and channel during a duration of DRS measurement timing configuration (DMTC).

In addition, the DRS can be transmitted only in a downlink subframe or a Downlink Pilot Time Slot (DwPTS) region of the subframe. The DRS is composed of N (N<=5) continuous subframes, and includes one PSS/SSS, where the CRS and the SSS are located on a same subframe. The DRS may have multiple types of RE configurations on CSI-RS, and there is a certain offset for a CSI-RS subframe with respect to an SSS subframe. The DRS is transmitted every M milliseconds, where M may be 40, 80 and 160.

The DRS is measured mainly by the UE based on the DMTC transmitted by the base station. The DMTC has the following configurations:

configuring one DMTC for the UE in each frequency, and reference time of an offset is time of a primary cell;

for a period "M" of the DMTC, candidate values are [40, 80, 160]; for the offset "L" of the DMTC, candidate values are [0, 1, . . . , M−1];

in addition to the period and the offset, the Radio Resource Control (RRC) further informs the UE of a measurement bandwidth, and the UE may consider that the measurement bandwidth is the same as a system bandwidth; and a length of the DMTC is set as 6 milliseconds.

In order to be compatible with the conventional CRS measurement, the DRS measurement and the CRS measurement may be configured simultaneously in the UE, and the UE may perform two types of measurements in parallel. In newest discussion on RAN2, the measurement based on CRS and the measurement based on DRS may be compared directly or the two measurements become comparable after certain conversion (depending on whether the DRS signal includes CSI-RS).

In addition, if the DRS measurement configuration signal is transmitted, the UE continues to perform DRS measurement no matter whether the UE is in a Discontinuous Reception (DRX) state. The process of DRS detection and RRM measurement may be configured in a UE in an active or sleeping cell.

Related contents of the small cell on/off technology have been introduced above. Technical problems to be solved in the present disclosure are introduced subsequently.

It can be known by investigation and survey that, when using the OTDOA technology, the UE firstly needs to acquire a neighboring cell info list provided by the location server, then the UE measures RSTD of cells in the list and a service cell, and reports the RSTD to the location server for performing positioning of the UE. However, the 3GPP proposes the small cell on/off technology before, so as to save energy sources and reduce interference between small cells. Therefore, in a case that the number of indoor UEs to be positioned is great, a base station which is appropriate for the UE to perform measurement may be in an off state. In a current standard, a base station in an off state cannot transmit a PRS, resulting in that the UE cannot perform measurement. If a cell base station, functioning as a cell with a measurement priority, is in an off state, it will result in that positioning accuracy of a part of UEs is reduced greatly and even the positioning cannot be performed by using the OTDOA.

For this case, in the present disclosure, it is expected to utilize the DRS as a reference signal to measure RSTD. However, some problems will appear when the DRS is taken as the reference signal.

For example, in a case that it is measured by utilizing the conventional DRS, it may result in that a DRS of a neighboring cell has a low measurement accuracy or cannot be measured due to a too low signal to noise ratio. Therefore, the DRS needs to be enhanced, such that a better measurement accuracy can be obtained by the OTDOA technology based on DRS.

Secondly, since a period of DRS (40, 80 or 160 ms) is shorter with respect to a period of PRS (160, 320, 640 or 1280 ms) and if each DRS is enhanced, it may result in enhanced interference between DRSs, thereby reducing measurability of the DRS. Therefore, preferably, it needs to introduce a coordination mechanism for the enhanced DRS, so as to reduce interference between DRSs and improve measurement accuracy.

Time for transmitting the enhanced DRS is worth studying. Since in some cases, a good RSTD measurement result can be obtained without transmitting the enhanced DRS. In addition, it is beneficial to save energy sources to not transmit enhanced DRS. Therefore, preferably, an on/off condition for the enhanced DRS may be designed.

When the DRS is used as a reference signal for RSTD measurement, a network side needs to provide corresponding auxiliary information to the UE to ensure measurement of the UE.

In addition, the DRS itself needs to function as a measurement signal based on cell discovery, and the enhanced DRS signal may influence the conventional DRS signal, for example resulting in that a measurement result based on cell discovery is not accurate and generating a wrong report event. Therefore, preferably, in order to make a signal intensity (RSRP) of the measured enhanced DRS signal is comparable with a signal intensity of the conventional DRS signal, a measurement result of the enhanced DRS signal may be corrected.

According to the present disclosure, a technical solution of OTDOA indoor positioning based on an enhanced DRS (eDRS) is provided for an indoor positioning scene, so as to solve a compatibility problem of the small cell on/off technology and the OTDOA technology, thereby achieving a better indoor positioning effect.

FIG. 1 shows a structure of an electronic device 100 in a wireless communication system according to an embodiment of the present disclosure. As shown in FIG. 1, the electronic device 100 may include a processing circuit 110. It should be noted that, the electronic device 100 may include one processing circuit 110, or include a plurality of processing circuits 110. In addition, the electronic device 100 may further include a communication unit 120 and so on.

Further, the processing circuit 110 may include various types of discrete functional units to perform different functions and/or operations. It should be noted that, the functional units may be physical entities or logic entities, and units with different names may be implemented by a same physical entity.

For example, as shown in FIG. 1, the processing circuit 110 may include a determining unit 111, a measuring unit 112 and a generating unit 113.

The determining unit 111 may determine positioning measurement auxiliary data for a UE. Here, the auxiliary data may include configuration information of an eDRS transmitted by at least one sleeping small cell base station.

The measuring unit 112 may perform positioning measurement on the eDRS transmitted by the at least one sleeping small cell base station based on the auxiliary data.

The generating unit 113 may generate positioning information based on a result of positioning measurement performed on the eDRS transmitted by the at least one sleeping small cell base station, to perform positioning on the UE. Here, the eDRS has a greater transmission power than the DRS, such that the UE can detect enough neighboring cells to perform positioning.

With the electronic device 100 according to the embodiment of the present disclosure, the positioning information can be generated based on the result of the positioning measurement performed on the eDRS transmitted by the sleeping small cell base station, to perform positioning on the UE. In this way, even if a base station in an off state does not transmit a PRS, positioning can be performed by using the eDRS transmitted by the sleeping small cell base station, thereby solving a compatibility problem of the small cell on/off technology and the OTDOA technology without greatly influencing an operation mode of an existing system and obtaining a better indoor positioning effect. It should be understood that, in some examples, the eDRS and the DRS carry the same information, therefore the eDRS may be regarded as the DRS in a specific state (for example transmitting with a higher power). For example, the conventional DRS may be indicated as a DRS in a first state, and the eDRS may be indicated as the DRS in a second state. Conversion of eDRS/DRS may be understood as conversion of transmission states of the DRS. For briefness of description, the DRS in the following refers to the conventional DRS.

According to a preferred embodiment of the present disclosure, the auxiliary data may include configuration information of an eDRS transmitted by a first sleeping small cell base station and configuration information of reference signals for positioning measurement transmitted by two other cell base stations. Further, the processing circuit 110 (such as the measuring unit 112) may perform positioning measurement on the eDRS transmitted by the first sleeping small cell base station and reference signals transmitted by the two other cell base stations based on the auxiliary data, and the processing circuit 110 (such as the generating unit 113) may calculate RSTD based on a determination result to generate positioning information.

According to a preferred embodiment of the present disclosure, among the two other cell base stations and the first sleeping small cell base station described above, one may be a positioning reference cell base station, and remaining two are neighboring cell base stations participating in positioning. Further, the processing circuit 110 (such as the determining unit 111) may read offset information between a reference signal of the neighboring cell base station and a reference signal of the reference cell base station in the auxiliary data, and the processing circuit 110 (such as the measuring unit 112) may perform measurement based on the offset information.

According to a preferred embodiment of the present disclosure, at least one of the two other cell base stations described above is an active cell base station, and a reference signal of the active cell base station is a PRS. The active cell base station may be a small cell base station or a macro cell base station. Further, the processing circuit 110 (such as the generating unit 113) may calculate RSTD based on measurement results of the eDRS and PRS.

According to a preferred embodiment of the present disclosure, configuration information of the eDRS may include at least one of a power configuration, a bandwidth, a period, a time offset and silent information of the eDRS. Here, a period of the eDRS may be an integral multiple of a period of the DRS which is greater than 1. In some examples, the configuration information is provided to the electronic device 100 by a network device such as a base station. For example, in a case that one or more of the power configuration, the bandwidth, the period, the time offset and the silent information of the eDRS is predetermined by a system (for example setting specific values or determining rules), the electronic device 100 reads pre-stored setting to acquire the configuration information. Here, the power configuration of the eDRS may be a power value or power offset with respect to the DRS or the like, for example.

According to a preferred embodiment of the present disclosure, the configuration information of the eDRS may include at least one of a cell base station identifier information, frequency information, antenna port configuration information and cyclic prefix length information of the at least one sleeping small cell base station for transmitting the eDRS.

According to the embodiment of the present disclosure, preferably or alternatively, the processing circuit 110 (such as the measuring unit 112) may perform radio resource management measurement on a DRS in a radio environment where the UE is located, to discover a neighboring sleeping small cell base station. It should be realized by those skilled in the art that, the processing circuit 110 may have only the function of positioning on the UE mentioned above, may have only the function of discovering the neighboring sleeping small cell base station mentioned here, or may have the two functions.

In a case that the electronic device 100 needs to discover a neighboring sleeping small cell base station based on the DRS, introduction of the eDRS may influence a small cell discovery result of the electronic device 100. Therefore, the processing circuit 110 (for example an identifying unit, not shown) may identify the eDRS based on measured signal intensity, and the processing circuit 110 (such as a correcting unit, not shown) may correct the discovery of the small cell in response to identification of the eDRS. Specifically, the processing circuit 110 may compare the measured signal intensity with a preset threshold to identify the eDRS. Alternatively, the processing circuit 110 may compare the measured signal intensity with currently measured signal intensity of a DRS of other cell, and identify the measured signal intensity as eDRS in a case that a difference is beyond a predetermined range. Alternatively, the processing circuit 110 may compare the measured signal intensity with historical signal intensity of the DRS (such as an average value) to identify the eDRS.

According to a preferred embodiment of the present disclosure, the processing circuit 110 (such as a correcting unit) correcting the discovery of the small cell may include neglecting the eDRS in a case of determining a result of radio resource management measurement. Alternatively, the eDRS may be replaced with a neighboring DRS prior to the eDRS in a case of determining the result of radio resource management measurement. In addition, a difference of transmission powers of the eDRS and the DRS may be subtracted from a receiving power of the eDRS.

It should be noted that, according to the embodiment of the present disclosure, the wireless communication system described above may be a Long Term Evolution-Advanced (LTE-A) cellular communication system, the electronic device 100 may be a UE (such as the positioned UE described above) in the wireless communication system, and the electronic device 100 may further include the communication unit 120 and so on. The communication unit 120 may receive positioning measurement auxiliary data from a network device and/or transmit positioning information to the network device via an air interface.

Figure 2:
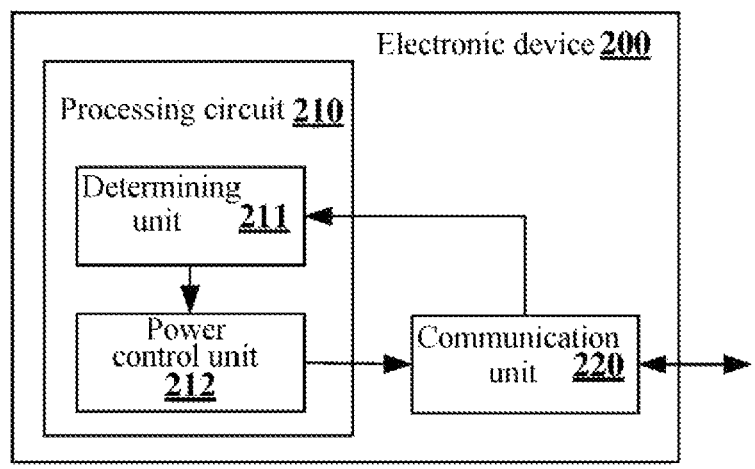
FIG. 2 is a block diagram showing a structure of an electronic device in a wireless communication system according to another embodiment of the present disclosure.

The electronic device at the UE side in the wireless communication system is described above. Subsequently an electronic device at a base station side in the wireless communication system is described in detail. FIG. 2 shows a structure of an electronic device 200 in the wireless communication system according to an embodiment of the present disclosure.

As shown in FIG. 2, the electronic device 200 may include a processing circuit 210. It should be noted that, the electronic device 200 may include one processing circuit 210, or include a plurality of processing circuits 210. In addition, the electronic device 200 may further include a communication unit 220 and so on.

As mentioned above, similarly, the processing circuit 210 may include various types of discrete functional units to perform different functions and/or operations. The functional units may be physical entities or logic entities, and units with different names may be implemented as one same physical entity.

As shown in FIG. 2, the processing circuit 210 may include a determining unit 211 and a power control unit 212.

The determining unit 211 may determine transmission configuration information of an eDRS from a control device.

The power control unit 212 may perform power control on a DRS of a small cell managed by a small cell base station based on the configuration information, to generate eDRS. Here, the eDRS has a greater transmission power than the DRS.

Preferably, the configuration information mentioned above may include an enhanced value indication of a transmission power and a transmission period. Here, the enhanced value indication of the transmission power may include a transmission power itself or only an extra enhanced value (such as power offset with respect to the DRS). Further, the processing circuit 210 (for example a power control unit 212) may enhance the transmission power of the DRS based on a transmission period, to generate an eDRS signal with the transmission period.

Preferably, a transmission period of the eDRS may be n multiples of a transmission period of the DRS, where n is an integer greater than 1. In this way, a requirement for discovering the small cell can be met, while interference on other DRS from the eDRS is reduced and energy resource can be saved at a certain degree.

Preferably, the configuration information mentioned above may include a time offset. For example, one eDRS measurement time configuration (eDMTC) is configured for the UE at each frequency, the period is an integral multiple of DMTC which is greater than 1, and the time offset indicates transmitting eDRS since which DMTC. Further, the processing circuit 210 (for example the power control unit 212) may enhance a transmission power of a corresponding DRS in each eDMTC period based on the time offset. In this way, the number of base stations transmitting the eDRS in a same DMTC becomes as small as possible, thereby reducing interference.

It should be noted that, according to the embodiment of the present disclosure, the wireless communication system described above may be an LTE-A cellular communication system, the electronic device 200 may be a small cell base station in the wireless communication system (for example a small cell base station transmitting an eDRS), and the electronic device 200 may further include a transceiver (for example the communication unit 220) configured to transmit an eDRS via an air interface.

Figure 3:
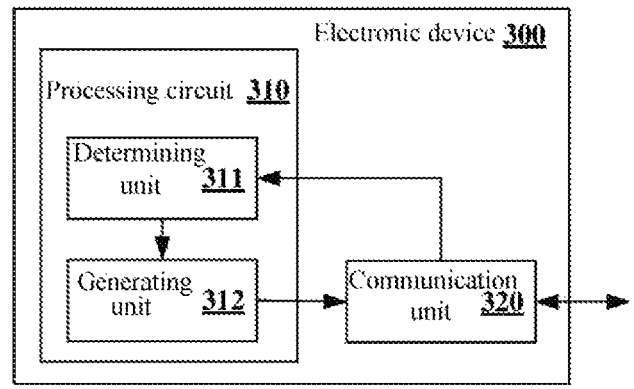
FIG. 3 is a block diagram showing a structure of an electronic device in a wireless communication system according to another embodiment of the present disclosure.

The electronic device at the base station side for performing configuration/transmission of the eDRS in the wireless communication system is described above. Subsequently an electronic device providing central control for the electronic device 200 for example in the wireless communication system is described in detail. FIG. 3 shows a structure of an electronic device 300 in the wireless communication system according to another embodiment of the present disclosure.

As shown in FIG. 3, the electronic device 300 may include a processing circuit 310. It should be noted that, the electronic devices 300 may include one processing circuit 310, or include a plurality of processing circuits 310. In addition, the electronic device 300 may further include a communication unit 320 and so on.

As mentioned above, similarly, the processing circuit 310 may include various types of discrete functional units to perform different functions and/or operations. The functional units may be physical entities or logic entities, and units with different names may be implemented by a same physical entity.

As shown in FIG. 3, the processing circuit 310 may include a determining unit 311 and a generating unit 312.

Based on at least one of the number of UEs to be positioned and positions of the UEs to be positioned in a predetermined geographical region, the determining unit 311 may determine whether to activate at least one sleeping small cell base station in the predetermined geographical region to transmit an eDRS, to perform positioning on the UE.

The generating unit 312 may generate transmission configuration information of an eDRS for a corresponding sleeping small cell base station based on a determination result. Here, the eDRS has a greater transmission power than the DRS.

Preferably, neighboring sleeping small cell base stations in the predetermined geographical region mentioned above may transmit eDRSs at different time.

Preferably, based on an interference condition of the eDRS and DRS between small cell base stations in the predetermined geographical region mentioned above, the processing circuit 310 (for example the determining unit 311) may determine whether to control at least one sleeping small cell base station in the predetermined geographical region to stop transmitting an eDRS.

Preferably, based on at least one of the number of sleeping small cell base stations in the predetermined geographical region mentioned above and a coverage of each sleeping small cell base station, the processing circuit 310 (for example the generating unit 312) may configure transmission parameters of the eDRS for each sleeping small cell base station in the predetermined geographical region.

Preferably, the transmission parameters of the eDRS mentioned above may include a transmission power. Further, the processing circuit 310 (for example the generating unit 312) may configure an enhanced value of the transmission power of the eDRS with respect to the transmission power of the DRS to reduce as the number of the sleeping small cell base stations in the predetermined geographical region increases, and/or increase as a coverage of the sleeping small cell base station increases.

Preferably, the transmission parameters of the eDRS mentioned above may include a transmission period. Further, the processing circuit 310 (for example the generating unit 312) may configure the transmission period to increase (i.e., extending) as the number of the sleeping small cell base stations in the predetermined geographical region increases.

Preferably, a transmission period of the eDRS may be n multiples of a transmission period of the DRS, where n is an integer greater than 1.

Preferably, the transmission parameters of the eDRS mentioned above may further include a transmission mode in the transmission period. Further, the processing circuit 310 (for example the generating unit 312) may configure different transmission modes with different time offsets for different sleeping small cell base stations in the predetermined geographical region.

It should be noted that, according to the embodiment of the present disclosure, the wireless communication system described above may be an LTE-A cellular communication system, the electronic device 300 may be a macro base station in the wireless communication system, and the predetermined geographical region mentioned above may be the coverage of the macro base station. The electronic device 300 may further include a transceiver (for example the communication unit 320) configured to transmit transmission configuration information of the eDRS to a corresponding sleeping small cell base station. Alternatively, the electronic device 300 may be a location server in a core network.

The electronic device in the wireless communication system according to the embodiments of the present disclosure is described summarily in conjunction with FIG. 1 to FIG. 3 above. Subsequently technical solutions of the present disclosure are further described in detail in conjunction with specific embodiments.

Firstly, an on/off condition for transmitting an eDRS by a sleeping small cell base station is described.

For example, each macro base station (or a location server), in a coverage of which (i.e., a management range) there is a small cell base station, may maintain a counter, and the counter maintains a two dimensional number (p, b). p indicates the number of all UEs to be positioned in the coverage of the macro base station in a time window with a predetermined length (including UEs served by small cells in the coverage of the macro base station). b indicates whether to transmit an eDRS. In a case that b is 1, a small cell in the coverage of the macro base station transmits an eDRS. In a case that b is 0, a small cell in the coverage of the macro base station transmits no eDRS.

For the on condition, in an example of the present disclosure, the sleeping base station determines whether to transmit an eDRS based on the number of UEs to be positioned.

When p is greater than a predefined upper limit ph and b is 0, the macro base station (or the location server) changes b into 1, and transmits configuration information of the eDRS to all small cell base stations in the coverage of the macro base station via an X2 interface (an S1 interface). The sleeping small cell base station in the coverage of the macro base station starts to transmit an eDRS signal in a next signal period after receiving the signaling. The macro base station may set a period of the eDRS according to a condition of network deployment.

For the off condition, the sleeping small cell base station stops transmitting an eDRS when the following conditions are met:

p is less than a predefined lower limit p1 and b is 1; and
interference between cells is great and b is 1.

The interference between the cells may include that: the small cell base station reports interference information of a DRS of a neighboring cell by DRS measurement of the UE. If a great number of UEs report to the base station that great interference is measured for the DRS in the coverage of the macro cell in a period, the small cell base stations in the coverage of the macro cell should stop transmitting an eDRS signal and start to transmit a DRS signal.

In another example of the present disclosure, the sleeping base station determines whether to transmit an eDRS based on a position of a UE to be positioned. For example, firstly a rough position of the UE to be positioned may be determined. Specifically, the rough position of the UE may be determined according to the conventional technology such as an uplink direction arrival angle of the UE and time advance, for example. Then, it may be determined whether a cell with a higher priority in neighboring cells of the UE is in a sleeping state. If the cell with the higher priority is in the sleeping state, configuration information of the eDRS may be transmitted to a corresponding sleeping cell to require the sleeping cell to transmit an eDRS for positioning measurement. For example, after positioning of the UE is completed (for example, after a predetermined period), the sleeping cell may be notified of quitting an eDRS transmission state.

Subsequently a configuration method of the eDRS is described in detail.

The eDRS proposed in the present disclosure is enhancement of the original DRS in an indoor positioning scene, and information on the eDRS such as a period and measurement is to be reconfigured.

The eDRS is characterized in enhancing a power of the DRS periodically. For example, the enhanced power value is roughly adjusted by the macro base station (or the location server) according to the number of cells starting eDRS and a coverage and so on, then the enhanced power value is transmitted to corresponding cells, and the cells adjust the enhanced power value finely according to sizes of the coverages. The greater the coverage is, the greater the enhanced power is. When rough adjustment is to be performed, the following factors are considered.

the number of cells starting eDRS, the greater the number of cells starting eDRS is, the less the enhanced power is, and there is a logarithm relation with e as bottom between the number of cells and the enhanced power; and the number of UEs to be positioned in the coverage of the macro cell, the greater the number of UEs is, the greater the enhanced power is.

A transmission period of an eDRS may be set as n multiples (n is an integer greater than 1) of a transmission period of a DRS, or may be determined by the macro base station (or the location server) according to actual cases and then is transmitted to a corresponding cell via X2 signaling, for example. The following factor is considered.

When the network is deployed densely and the number of cells starting eDRS increases, n may be increased accordingly to reduce interference to other signals from eDRS.

After the DRS is enhanced, it may result in that interference between neighboring cells is enhanced, particularly when two neighboring cells transmit eDRSs at a same time instant. Therefore, a coordination mechanism is designed according to the present disclosure, such that eDRSs between cells are staggered in time to reduce interference.

When a transmission period of the eDRS is n multiples of a transmission period of the DRS, there may be (n+1) types of configuration modes without conflict. For briefness of the description, a time instant for transmitting the DRS is indicated as "0" and a time instant for transmitting the eDRS is indicated as "1". In this case, configuration modes in a case of n=4 may include "0000", "0001", "0010", "0100" and "1000". Different modes may be recorded according to a position of "1" in the configuration modes. When "1" is at a first bit from the left, the mode is indicated as 1, and so on, when "1" is at an n-th bit from the left, the mode is indicated as n; and when "1" does not appear in the configuration mode, the mode is indicated as 0.

When m cells in a small cell cluster need to configure eDRS transmission modes, the location server transmits a specific eDRS configuration mode to each cell which needs to configure eDRS according a priority of the cell. The location server may maintain a list, and a priority of each cell may be determined according to the number of times x when the cell ranks top three in a neighboring cell info list in one eDRS period. The greater the x of each cell is, the greater the priority of the cell is. When cells have the same x, a cell with a greater PCI has a higher priority.

Configuration modes of eDRS are discussed in accordance with two types of cases in the following.

When m≤n, priorities of cells in the small cell cluster are assigned sequentially from high to low: 1, 2, . . . , m; and When m>n, priorities of the cells are assigned sequentially from high to low: 1, 2, . . . , n, 0, 0, . . . . In which, the number of 0 is m−n. It is recorded as an array a={1, 2, . . . , n, 0, 0, . . . }, a is shifted right by (m−n) bits after each eDRS period elapses, such that each cell can transmit an eDRS.

The macro base station (or the location server) transmits m, n and an eDRS configuration mode of each cell to each cell, and the cell may calculate an eDRS transmission mode thereof in each period according to the above rules.

Figure 4:
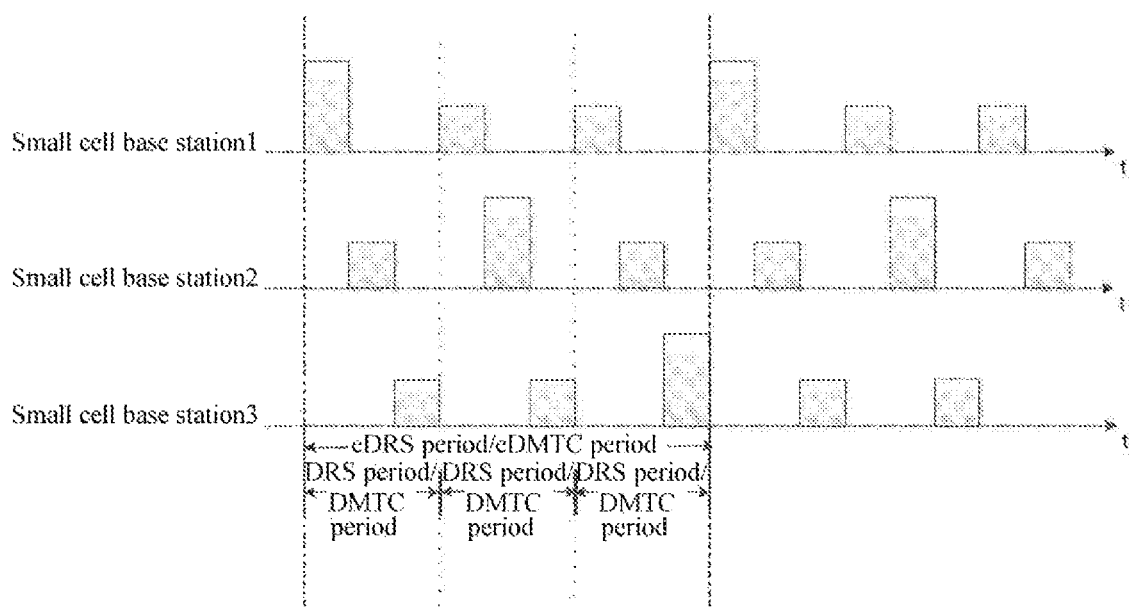
FIG. 4 is a schematic diagram showing an example of a configuration mode of an enhanced DRS (eDRS)

FIG. 4 shows a configuration mode of an eDRS when m=3 and n=3. As shown in FIG. 4, eDRS transmission between neighboring small cell base station 1, small cell base station 2 and small cell base station 3 is staggered in time, thereby reducing interference.

eDRS measurement configuration may be indicated by a measurement configuration table.

For example, OTDOA auxiliary data related to the eDRS includes two elements as follows.

1. OTDOA Reference Cell Info, which includes parameters of a reference cell, and parameters in an OTDOA neighboring cell list are set according to the element.

2. OTDOA Neighboring Cell Info, which includes parameters of each neighboring cell ranked in a descending order of measurement priorities, the order is determined by the macro base station or the location server, and the UE measures RSTD in an order provided by the network side.

According to a design example of the present disclosure, OTDOA Reference Cell Info and OTDOA Neighboring Cell Info related to the eDRS are included in "ProvideAssistanceData" message of the 3rd Generation Partnership Project (3GPP) standard, and "ProvideAssistanceData" message and "RequestAssitanceData" message are included in "LPP message". According to 3GPP TS24.171, "LPP messages"

are transmitted by "Uplink/Downlink Generic NAS Transport message", that is, "LPP messages" are included in an NAS protocol.

OTDOA Reference Cell Info elements include an identifier and eDRS configuration information and so on of a reference cell. As shown in table 1, "M" indicates that the element appears in the measurement information certainly, "O" indicates that it is optional whether the element appears in the measurement information, and "C" indicates that the element appears in the measurement information at a certain condition which is described in a definition of the element.

TABLE 1

| | OTDOA reference cell auxiliary information | |
|---|---|---|
| element | definition | appear |
| physical cell ID | specify PCI of a reference cell; identify a cell and is used to determine a PRS sequence | M |
| cell global ID | specify ECGI of a reference cell, which is a unique global ID of the cell in E-UTRA and may be used to solve any PCI fuzzy problem | O |

TABLE 1-continued

| | OTDOA reference cell auxiliary information | |
|---|---|---|
| element | definition | appear |
| EARFCN | When different from a primary cell of the UE, it is used to specify EARFCN of a reference cell | C |
| Antenna port configuration | When different from a primary cell of the UE, specify whether 1 (or 2) or 4 antenna ports are for CRS of a reference cell, and determine a CRS mapped into a resource unit | C |
| CP length | When different from a primary cell of the UE, specify a cyclic prefix length of eDRS and CRS of the reference cell, and determine that a sequence is generated and mapped to a resource unit | C |
| eDRS Info | If eDRS is configured in a reference cell, eDRS configuration of the cell is defined | C |

OTDOA Neighboring Cell Info elements include an identifier, eDRS configuration information and an RSTD measurement window and so on of each neighboring cell, as shown in table 2. The neighboring cell information list may include information on 72 cells at most.

TABLE 2

| | OTDOA neighboring cell auxiliary information | |
|---|---|---|
| element | definition | appear |
| Physical cell ID | Specify PCI of a specific neighboring cell, identify a cell and is used to determine an eDRS sequence | M |
| Cell global ID | Specify ECGI of a specific neighboring cell, which is a unique global ID of the cell in E-UTRA and may be used to solve any PCI fuzzy problem | O |
| EARFCN | When different from an OTDOA reference cell, specify EARFCN of a specific neighboring cell | C |
| CP length | When different from an OTDOA reference cell, specify a cyclic prefix length of eDRS and CRS of a specific neighboring cell, and determine that a sequence is generated and mapped to a resource unit | C |
| eDRS Info | When different from an OTDOA reference cell, determine eDRS configuration of the cell | C |
| Antenna port configuration | When different from an OTDOA reference cell, specify whether 1 (or 2) or 4 antenna ports are for CRS of a specific neighboring cell, and determine CRS mapped into a resource unit | C |
| Time slot number offset | When time slot timing is different from that of an OTDOA reference cell, specify a time slot number offset at a transmitter between the cell and an auxiliary data reference cell; the time slot number offset together with a current time slot number of the auxiliary data reference cell is used to calculate a current time slot number of the cell, and the time slot number may be used to generate a CRS sequence by a target device; eDRS/CRS sequence depends on a frame/time slot timing | C |
| eDRS subframe offset | (in a case that an intermediate frequency cell is included in auxiliary data), specify an offset between a first eDRS subframe in an auxiliary data reference cell on a reference carrier frequency and a first eDRS subframe in subsequent recent eDRS positioning scenes of the cell on other carrier frequencies | C |
| Expected RSTD | specify an RSTD value to be expected to be measured by a UE between the cell and the auxiliary data reference cell | M |
| Uncertainty of the expected RSTD | Specify uncertainty of the expected RSTD value | M |

Specific parameters of eDRS are indicated as table 4.

TABLE 4 eDRs-Info

| element | definition | appear |
|---|---|---|
| DRS bandwidth | Specify a bandwidth for DRS by the number of resource blocks, 1.4 MHz, 3 MHz, 5 MHz, 10 MHz, 15 MHz and 20 MHz are available | M |
| eDRS period | Specify a period of eDRS, 40 ms, 80 ms, 160 ms, 320 ms, 640 ms and 1280 ms are available | M |
| eDRS subframe offset | Specify eDRS offset, [0, 1, . . . , M−1] are available, M is a DRS period | M |
| Silent information | if using silent information, specify silent configuration of the eDRS of the cell | C |

When a base station transmits an eDRS, the UE will measure the eDRS. A measurement result is mainly used for measurement for OTDOA positioning and measurement for small cell discovery. Hereinafter the two measurement events are discussed.

In a case that the measurement result is used for measurement for the OTDOA positioning, when a cell in an OTDOA-Neighboring Cell Info list transmitted to the UE by the location server through a base station is transmitting an eDRS, auxiliary information in the list includes a DRS subframe offset and eDRS info. The UE measures an eDRS signal of a corresponding cell according to the information. For calculating RSTD between eDRS and eDRS or between PRS and eDRS, the UE uses a time difference between the two detected positioning signals (eDRS and eDRS or PRS and eDRS) as an RSTD value for calculating by the location server. For example, in a case that positioning signals are not synchronous, the server records configuration transmission time of each positioning signal, and processes the RSTD value reported by the UE to obtain an actual receiving time difference. In an example, two positioning signals are configured to be transmitted synchronously, the UE subtracts an integral multiple of 1 ms from the time difference between the two detected positioning signals, such that the time different is less than 1 ms. Since the time difference between two positioning signals is impossible to be greater than 1 ms (i.e., the distance is impossible to be greater than 300 m) in an indoor scene. Meanwhile, a measurement result (RSTD) may be reported to the location server through the service base station.

In a case that the measurement result is used for measurement for small cell discovery, when the UE measures a reference signal, an eDRS signal influences the DRS signal certainly. Since a power of the eDRS is greater than a power of a conventional DRS signal for a certain offset, the eDRS signal needs to be detected at a UE side and an eDRS detection result needs to be corrected before a reference signal measured by the UE enters an L3 filter, such that signal intensity of the measured eDRS is comparable with signal intensity of the DRS and no influence on discovery of the small cell is generated.

When the UE detects that an offset of RSRP measurement results of two continuous DRSs in a certain cell is greater than a certain threshold ΔP, it may be considered that the UE detects the eDRS signal and a trigger event Aj for correcting the eDRS is to be triggered. The UE is to correct a greater DRS measurement result. There is a positive correlation between the threshold ΔP and a difference of powers of the eDRS and the DRS of the cell.

When the trigger event Aj for correcting the eDRS is triggered, an eDRS detection result may be corrected by the following methods.

A measurement result of the eDRS signal is neglected and is not inputted into the L3 filter.

A sample value of a last un-enhanced DRS is used as input of a current sample value.

Alternatively, after subtracting a currently increased DRS signal power, the eDRS detection result is inputted into the L3 filter.

Hereinafter a signal interaction flow between a base station side and a user side in a wireless communication system according to an embodiment of the present disclosure is further described in detail in conjunction with FIG. 5 to FIG. 7.

Figure 5:
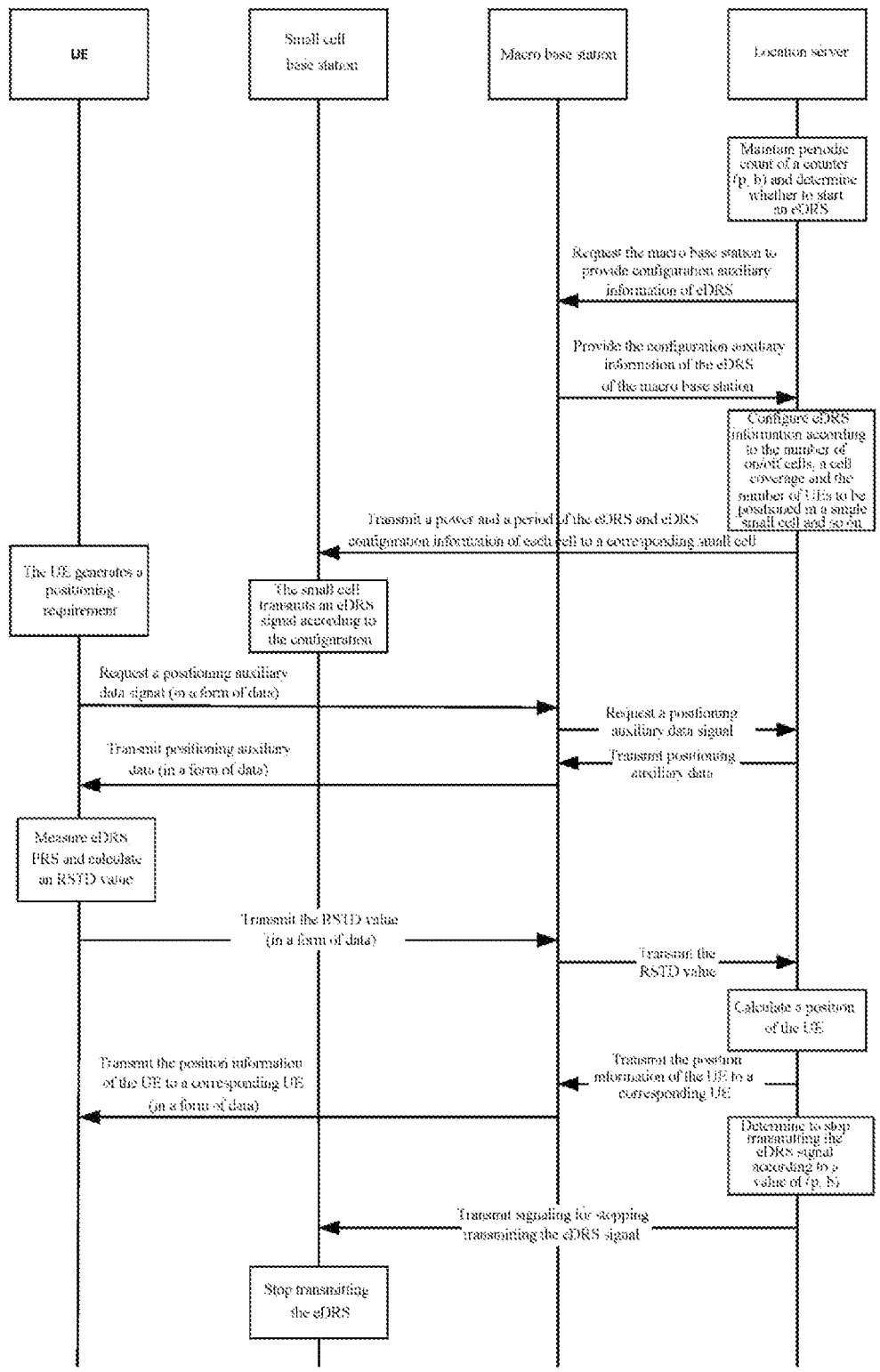
FIG. 5 is a sequence diagram showing a method for performing wireless communication in a wireless communication system according to an embodiment of the present disclosure.

FIG. 5 is a sequence diagram showing a method for performing wireless communication in a wireless communication system according to an embodiment of the present disclosure. In FIG. 5, a location server is taken as a control center.

As shown in FIG. 5, firstly, the location server may maintain periodic count of a counter (p, b) to determine whether to start an eDRS.

Subsequently, the location server may require a macro base station to provide configuration auxiliary information of the eDRS.

After receiving a request from the location server, the macro base station may provide the configuration auxiliary information of the eDRS to the location server.

Subsequently, the location server may configure eDRS information according to the number of on/off cells, a cell coverage and the number of UEs to be positioned in a single small cell and so on.

Subsequently, the location server may transmit an eDRS power, a period and eDRS configuration information of each cell to a corresponding small cell base station.

Then, the small cell base station may transmit an eDRS signal based on the configuration.

When the UE generates a positioning requirement, the UE may request a current service base station, such as a macro base station, of a positioning auxiliary data signal (in a form of data). The macro station may in turn request the location server of the positioning auxiliary data signal. It should be noted that, the positioning requirement may be initiated by the UE, the service base station of the UE or the location server itself. If the positioning requirement is initiated by a network side, the network side may directly transmit auxiliary data without a request from the UE, and the network side is not necessarily to feed back a positioning result to the UE after calculating a position of the UE.

Subsequently, the location server may transmit positioning auxiliary data to the macro base station. The macro base station may in turn transmit positioning auxiliary data (in a form of data) to the UE.

Then, the UE may measure eDRS, PRS and calculate an RSTD value.

Subsequently, the UE may transmit the RSTD value (in a form of data) to the macro base station. The macro base station may in turn transmit the RSTD value to the location server.

Subsequently, the location server may calculate a position of the UE, and then transmit the calculated position information of the UE to the macro base station. The macro base station may in turn transmit the position information of the UE (in a form of data) to a corresponding UE. In this way, the UE is positioned.

In addition, the location server may determine to stop transmitting an eDRS signal according to a value of (p,b). Then, the location server may transmit signaling for stopping transmitting the eDRS signal to the small cell base station. After receiving the signaling, the small cell base station may stop transmitting an eDRS.

Figure 6:
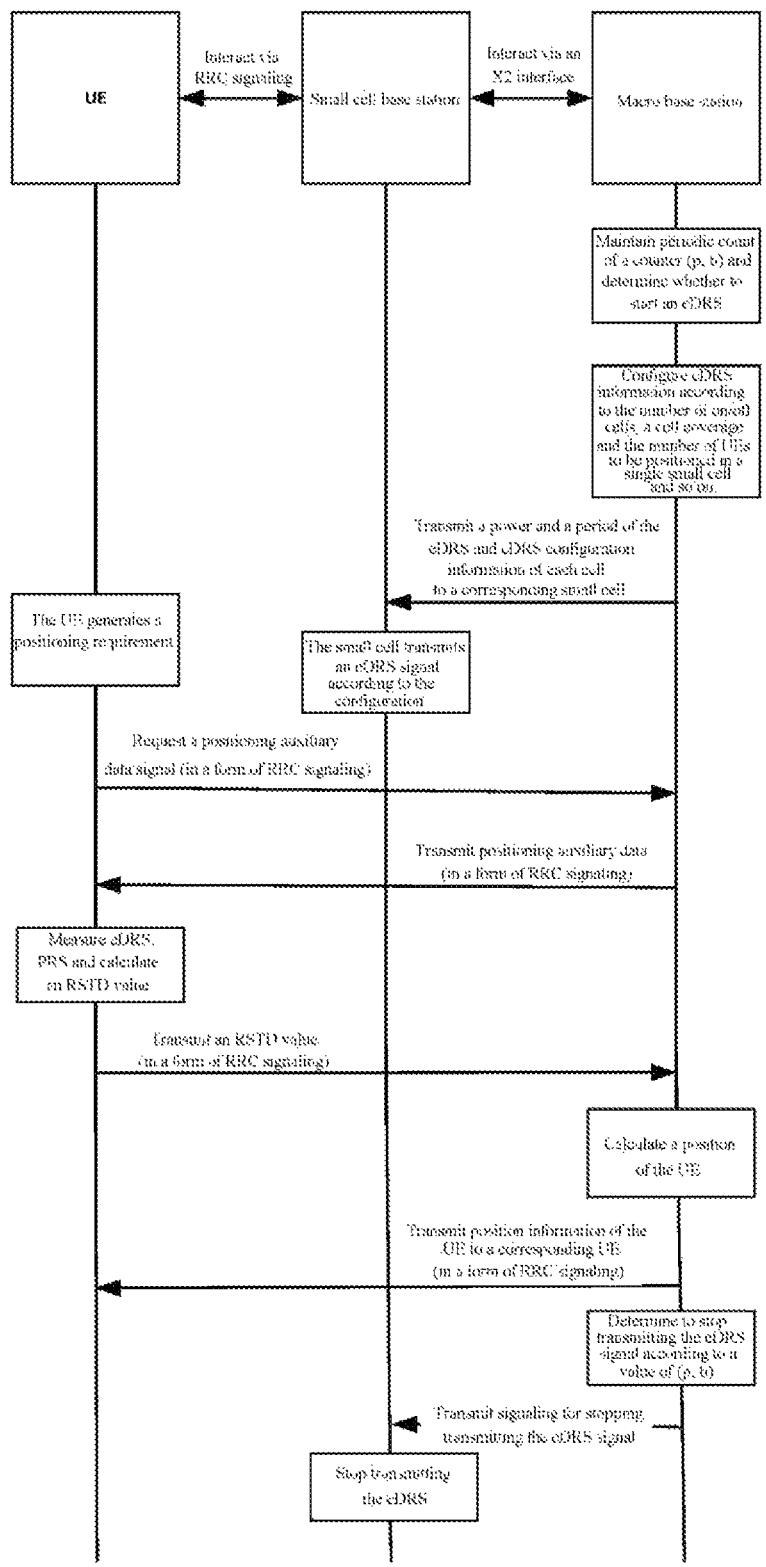
FIG. 6 is a sequence diagram showing a method for performing wireless communication in a wireless communication system according to another embodiment of the present disclosure.

FIG. 6 is a sequence diagram showing a method for performing wireless communication in a wireless communication system according to another embodiment of the present disclosure. In FIG. 6, a macro base station is taken as a control center.

As shown in FIG. 6, it is interacted between a UE and a small cell base station by RRC signaling, and it is interacted between the small cell base station and the macro base station via an X2 interface.

Firstly, the macro base station may maintain periodic count of a counter (p, b) to determine whether to start an eDRS.

Subsequently, the macro base station may configure eDRS information according to the number of on/off cells, a cell coverage and the number of UEs to be positioned in a single small cell and so on.

Subsequently, the macro base station may transmit an eDRS power, a period and eDRS configuration information of each cell to a corresponding small cell base station.

Then, the small cell base station may transmit an eDRS signal according to the configuration.

When the UE generates a positioning requirement, the UE may request the macro base station of a positioning auxiliary data signal (in a form of RRC signaling).

Subsequently, the macro base station may transmit the positioning auxiliary data (in a form of RRC signaling) to the UE.

Then, the UE may measure the eDRS, the PRS and calculate an RSTD value.

Subsequently, the UE may transmit the RSTD value to the macro base station.

Subsequently, the macro base station may calculate a position of the UE, and then transmit the calculated position information of the UE (in a form of RRC signaling) to a corresponding UE. In this way, the UE is positioned.

In addition, the macro base station may determine to stop transmitting an eDRS signal according to a value of (p, b). Then, the macro base station may transmit signaling for stopping transmitting the eDRS signal to a small cell base station. After receiving the signaling, the small cell base station may stop transmitting the eDRS.

Figure 7:
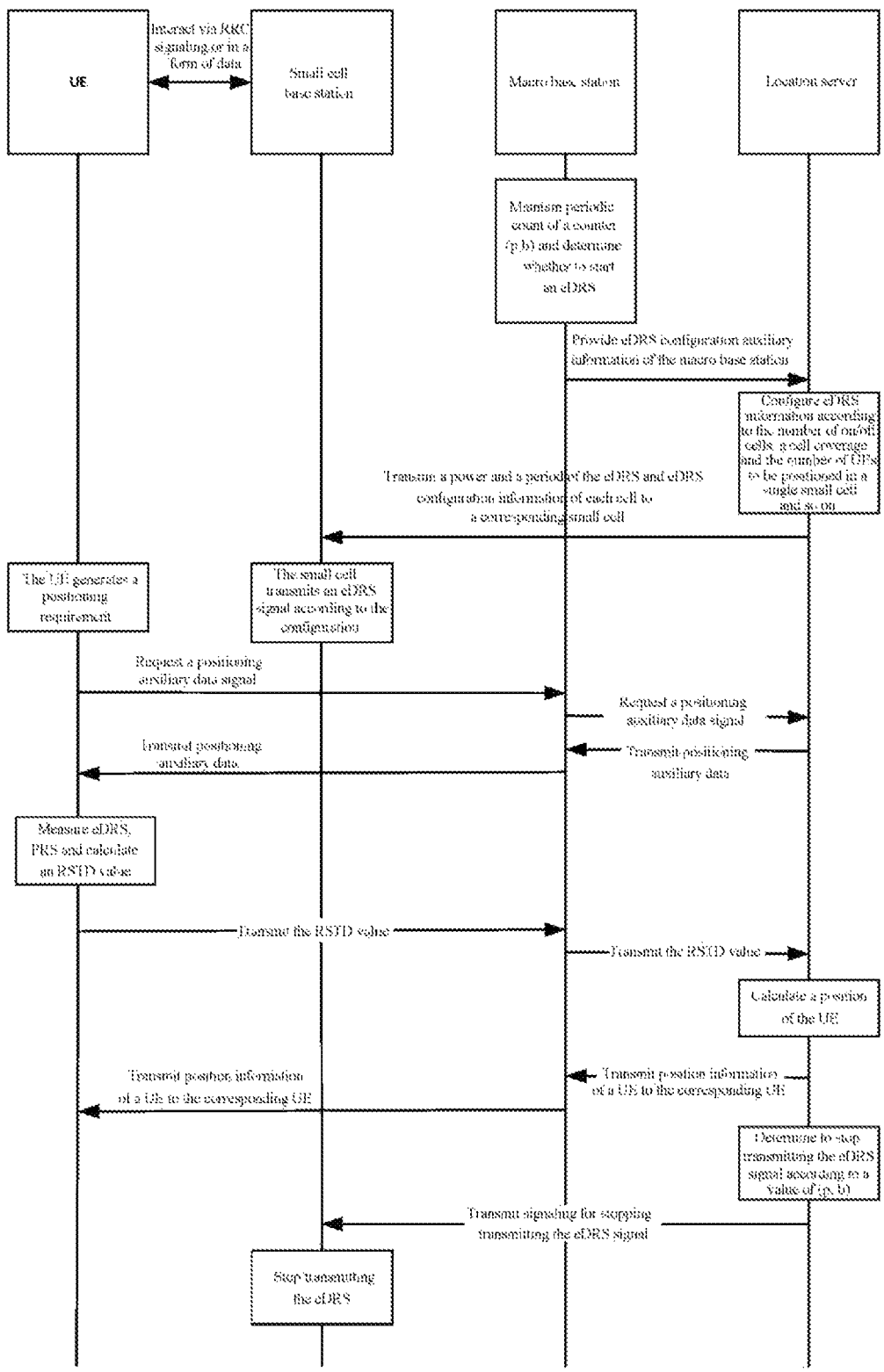
FIG. 7 is a sequence diagram showing a method for performing wireless communication in a wireless communication system according to another embodiment of the present disclosure.

FIG. 7 is a sequence diagram showing a method for performing wireless communication in a wireless communication system according to another embodiment of the present disclosure. In FIG. 7, a macro base station and a location server are taken as a hybrid control center.

As shown in FIG. 7, it may be interacted between a UE and a small cell base station via RRC signaling or in a form of data.

Firstly, the macro base station may maintain periodic count of a counter (p,b) to determine whether to start an eDRS.

Subsequently, the macro base station may provide configuration auxiliary information of the eDRS to the location server.

Subsequently, the location server may configure eDRS information according to the number of on/off cells, a cell coverage and the number of UEs to be positioned in a single small cell and so on.

Subsequently, the location server may transmit an eDRS power, a period and eDRS configuration information of each cell to a corresponding small cell base station.

Then, the small cell base station may transmit an eDRS signal according to the configuration.

When the UE generates a positioning requirement, the UE may request the macro base station of a positioning auxiliary data signal. The macro base station may in turn request the location server of the positioning auxiliary data signal.

Subsequently, the location server may transmit positioning auxiliary data to the macro base station. The macro base station may in turn transmit the positioning auxiliary data to the UE.

Then, the UE may measure the eDRS, the PRS and calculate an RSTD value.

Subsequently, the UE may transmit the RSTD value to the macro base station. The macro base station may in turn transmit the RSTD value to the location server.

Subsequently, the location server may calculate a position of the UE and then transmit the calculated position information of the UE to the macro base station. The macro base station may in turn transmit the position information of the UE to a corresponding UE. In this way, the UE is positioned.

In addition, the location server may determine to stop transmitting an eDRS signal according to a value of (p, b). Then, the location server may transmit signaling for stopping transmitting the eDRS signal to a small cell base station. After receiving the signaling, the small cell base station may stop transmitting the eDRS.

Subsequently, a method for performing wireless communication in a wireless communication system according to an embodiment of the present disclosure is described with reference to FIG. 8.

Figure 8:
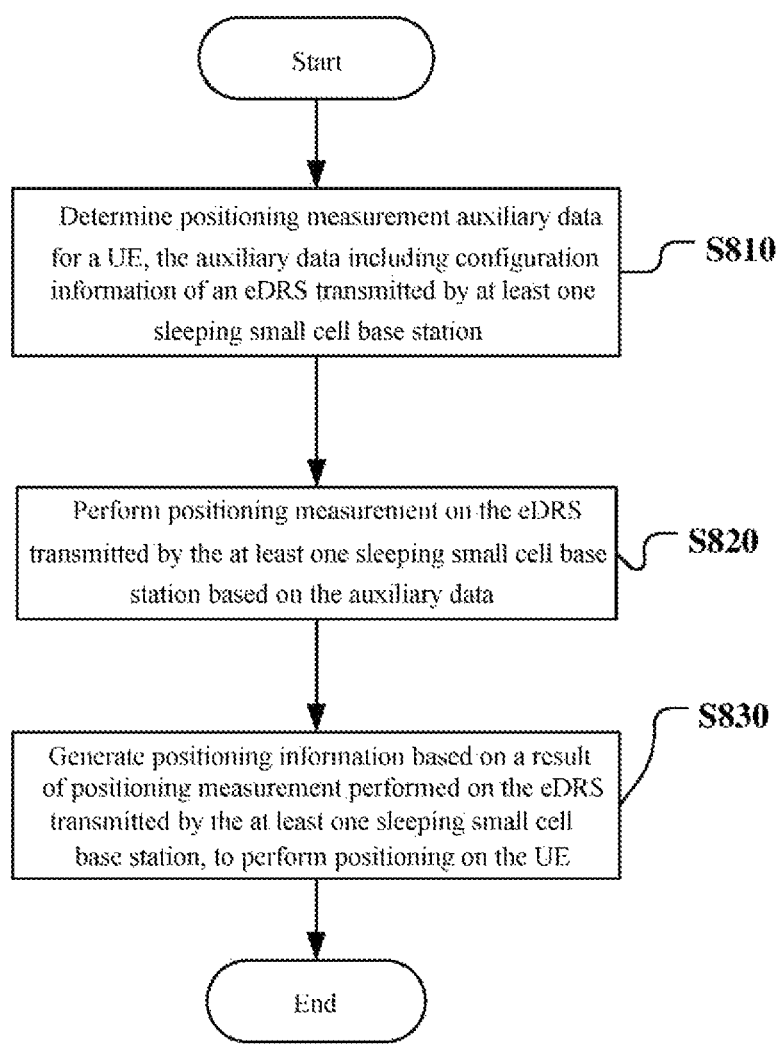
FIG. 8 is a flowchart showing a method for performing wireless communication in a wireless communication system according to an embodiment of the present disclosure.

As shown in FIG. 8, in step S810, positioning measurement auxiliary data for a UE is determined. The auxiliary data includes configuration information of an eDRS transmitted by at least one sleeping small cell base station.

Then, in step S820, positioning measurement is performed on the eDRS transmitted by the at least one sleeping small cell base station based on the auxiliary data.

Lastly, in step S830, positioning information is generated based on a result of the positioning measurement performed on the eDRS transmitted by the at least one sleeping small cell base station, to perform positioning on the UE. Here, the eDRS has a greater transmission power than the DRS.

Preferably, the auxiliary data may include configuration information of eDRS transmitted by a first sleeping small cell base station and configuration information of a reference signal for positioning measurement transmitted by two other small cell base stations. Further, the method may include: performing positioning measurement on the eDRS transmitted by the first sleeping small cell base station and the reference signal transmitted by the two other small cell base stations based on the auxiliary data, and calculating RSTD based on a measurement result to generate positioning information.

Preferably, among the two other small cell base stations and the first sleeping small cell base station mentioned above, one may be a positioning reference cell base station, and remaining two may be neighboring cell base stations participating in positioning. Further, the method may include: reading offset information between a reference signal of the neighboring cell base station and a reference signal of the reference cell base station in the auxiliary data, and performing measurement based on the offset information.

Preferably, at least one of the two other cell base stations mentioned above may be an active cell base station, and a reference signal of the active cell base station may be PRS. Further, the method may include: calculating RSTD based on measurement results of the eDRS and the PRS.

Preferably, configuration information of the eDRS may include at least one of a power configuration, a bandwidth, a period, a time offset and silent information of the eDRS. A period of the eDRS is an integral multiple of a period of the DRS which is greater than 1.

Preferably, the configuration information of the eDRS may further include at least one of cell base station identifier information, frequency information, antenna port configuration information and cyclic prefix length information of the at least one sleeping small cell base station.

Preferably, the method may further include: performing radio resource management measurement on a DRS in a radio environment where a user equipment is located, to discover a neighboring sleeping small cell base station; and identifying an eDRS based on measured signal intensity and correcting the discovery of a small cell in response to identification of the eDRS.

Preferably, the correcting the discovery of the small cell may include: when determining a result of radio resource management measurement, neglecting the eDRS; replacing the eDRS with a neighboring DRS prior to the eDRS; or subtracting, from a receiving power of the eDRS, a difference between transmission powers of the eDRS and the DRS.

In another aspect, a method for performing wireless communication in a wireless communication system according to another embodiment of the present disclosure may include: determining transmission configuration information of an eDRS from a control device; and performing power control on DRS of a small cell managed by a small cell base station based on the configuration information, to generate an eDRS. The eDRS has a greater transmission power than the DRS.

Preferably, the configuration information may include an enhanced value indication of a transmission power and a transmission period. Further, the method may include: enhancing the transmission power of the DRS based on the transmission period, to generate an eDRS signal with the transmission period.

Preferably, a transmission period of the eDRS may be n multiples of a transmission period of the DRS, where n is an integer greater than 1.

Preferably, the configuration information may further include a time offset. Further, the method may include: enhancing a transmission power of a corresponding DRS in each transmission period based on the time offset.

In another aspect, a method for performing wireless communication in a wireless communication system according to another embodiment of the present disclosure may include: determining, based on at least one of the number of user equipments to be positioned and positions of the user equipments to be positioned in a predetermined geographical region, whether to activate at least one sleeping small cell base station in the predetermined geographical region to transmit an eDRS, to perform positioning on the user equipment; and generating transmission configuration information of the eDRS for a corresponding sleeping small cell base station based on a determination result. The eDRS has a greater transmission power than the DRS.

Preferably, neighboring sleeping small cell base stations in the predetermined geographical region may transmit eDRSs at different time.

Preferably, the method may further include: determining, based on an interference condition of the eDRS and the DRS between small cell base stations in the predetermined geographical region, whether to control at least one sleeping small cell base station in the predetermined geographical region to stop transmitting the eDRS.

Preferably, the method may further include: configuring transmission parameters of the eDRS for each sleeping small cell base station in the predetermined geographical region, based on at least one of the number of sleeping small cell base stations in the predetermined geographical region and a coverage of each sleeping small cell base station.

Preferably, the transmission parameters of the eDRS may include a transmission power. Further, the method may include: configuring an enhanced value of the transmission power of the eDRS with respect to a transmission power of the DRS to reduce as the number of the sleeping small cell base stations in the predetermined geographical region increases; and/or increase as a coverage of the sleeping small cell base station increases.

Preferably, the transmission parameters of the eDRS may include a transmission period. Further, the method may include: configuring the transmission period to increase as the number of sleeping small cell base stations in the predetermined geographical region increases.

Preferably, a transmission period of the eDRS may be n multiples of a transmission period of the DRS, where n is an integer greater than 1.

Preferably, the transmission parameter of the eDRS may further include a transmission mode in the transmission period. Further, the method may include: configuring different transmission modes with different time offsets for different sleeping small cell base stations in the predetermined geographical region.

Specific implementations of steps of the methods for performing wireless communication in the wireless communication system according to the embodiments of the present disclosure have been described in detail above, which are not repeated here.

The technology according to the present disclosure may be applied to various types of products. For example, the location server mentioned in the present disclosure may be implemented as any type of server, such as a tower-type server, a rack-type server and a blade-type server. The location server may be a control module installed on a server (including an integrated circuit module with a single wafer and a card or a blade inserted into a slot of the blade-type server, for example).

For example, the base station mentioned in the present disclosure may be implemented as any type of evolution Node B (eNB), such as a macro eNB and a small eNB. The small eNB may be a eNB of a cell with a coverage less than that of a macro cell, such as a pico-eNB, a micro-eNB and a household (femto) eNB. Alternatively, the base station may be implemented as any other types of base stations, such as a NodeB and a base transceiver station (BTS). The base station may include: a body configured to control wireless communication (also referred to as a base station device); and one or more remote radio head-end (RRH) arranged at different places from the body. In addition, various types of terminals described in the following may function as a base station to operate by performing functions of the base station temporarily or in a semi-persistent manner.

For example, the UE mentioned in the present disclosure may be implemented as a mobile terminal (such as a smart phone, a tablet personal computer (PC), a notebook PC, a portable game terminal and a portable/dongle mobile router and a digital camera) or a vehicle-mounted terminal (such as a vehicle navigation device). The UE may be further implemented as a terminal performing machine to machine (M2M) communication (also referred to as a MTC terminal). In addition, the UE may be a wireless communication module installed on each of the above terminals (such as an integrated circuit module including a single wafer).

Figure 9:
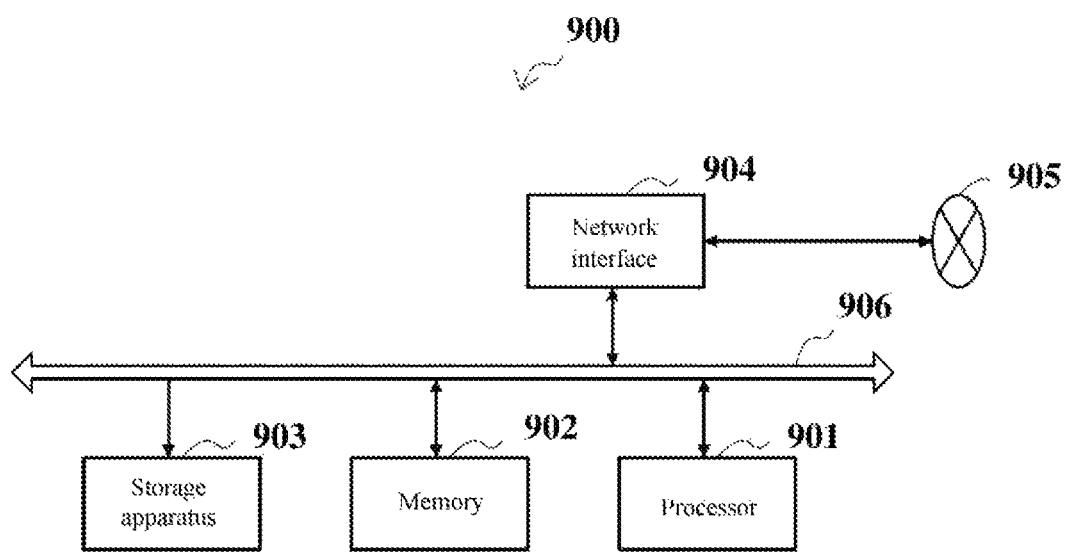
FIG. 9 is a block diagram showing an example of a schematic configuration of a server which adapts to the present disclosure.

FIG. 9 is a block diagram showing an example of a schematic configuration of a server 900 to which the technology of the present disclosure may be applied. The server 900 includes: a processor 901, a memory 902, a storage device 903, a network interface 904 and a bus 906.

The processor 901 may be a central processing unit (CPU) or a digital signal processor (DSP) for example, and control functions of the server 900. The memory 902 includes a random access memory (RAM) and a read only memory (ROM), and stores programs performed by the processor 901 and data. The storage device 903 may include a storage medium, such as a semiconductor memory and a hard disk.

The network interface 904 is a wired communication interface for connecting the server 900 to a wired communication network 705. The wired communication network 705 may be a core network such as evolved packet core (EPC) or a packet data network (PDN) such as the Internet.

The bus 906 connects the processor 901, the memory 902, the storage device 903 and the network interface 904 with each other. The bus 906 may include two or more buses with different speeds (such as a high speed bus and a low speed bus).

Figure 10:
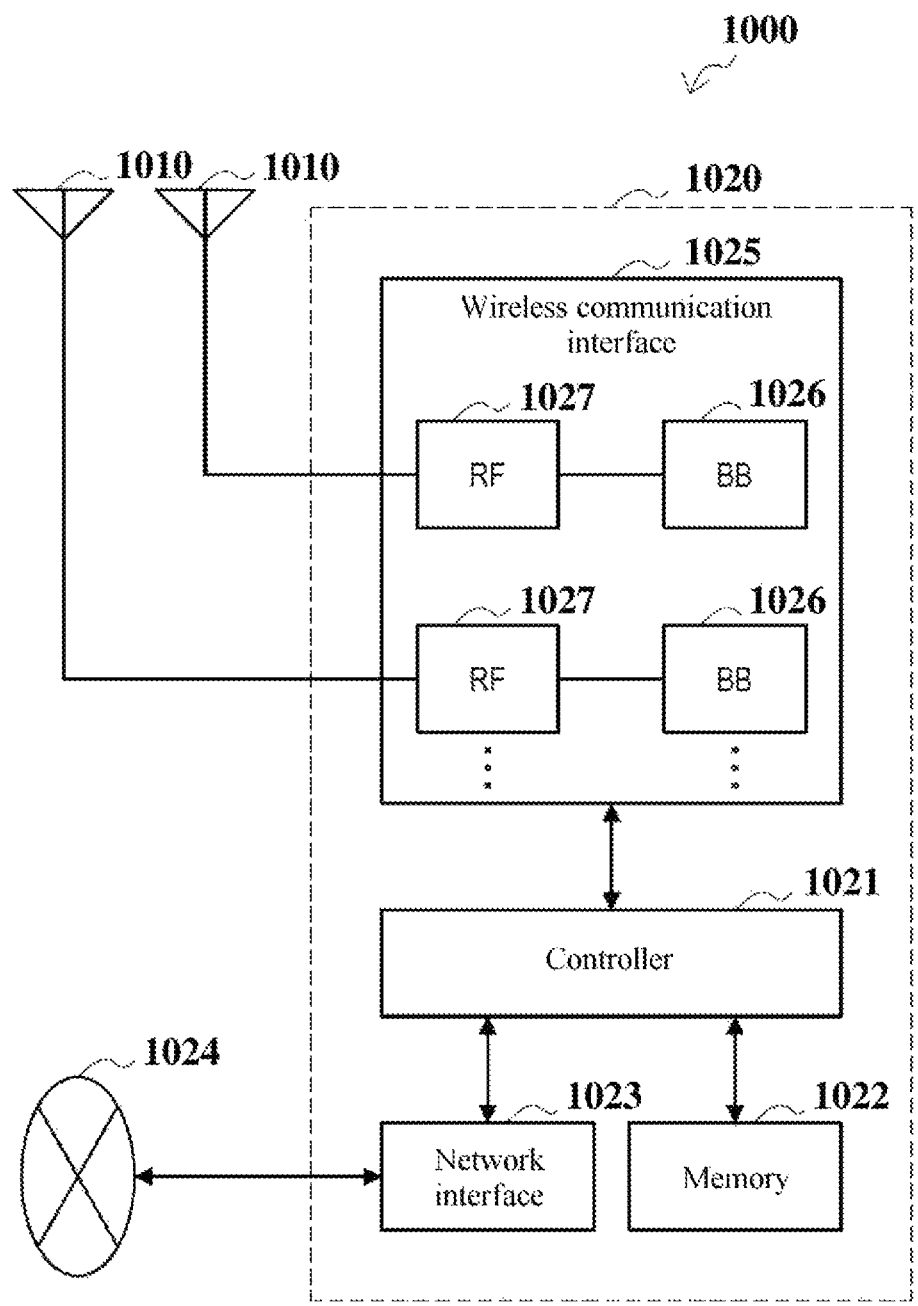
FIG. 10 is a block diagram showing a first example of a schematic configuration of an evolution Node Base Station (eNB) which adapts to the present disclosure.

FIG. 10 is a block diagram showing a first example of a schematic configuration of an eNB to which the technology of the present disclosure may be applied. An eNB 1000 includes one or more antennas 1010 and a base station device 1020. The base station device 1020 and each antenna 1010 may be connected to each other via an RF cable.

Each of the antennas 1010 includes a single or multiple antenna elements (such as multiple antenna elements included in a multiple-input multiple-output (MIMO) antenna) and is used for the base station device 1020 to transmit and receive a wireless signal. As shown in FIG. 10, the eNB 1000 may include multiple antennas 1010. For example, the multiple antennas 1010 may be compatible with multiple frequency bands used by the eNB 1000. Although FIG. 10 shows an example in which the eNB 1000 includes multiple antennas 1010, the eNB 1000 may include a single antenna 1010.

The base station device 1020 includes a controller 1021, a memory 1022, a network interface 1023 and a wireless communication interface 1025.

The controller 1021 may be a CPU or DSP for example and controls various types of functions of higher layers of the base station device 1020. For example, the controller 1021 generates a data packet according to data in a signal processed by the wireless communication interface 1025, and transfers the generated packet via the network interface 1023. The controller 1021 may bundle data from multiple baseband processors to generate a bundle packet and transfers the generated bundle packet. The controller 1021 may have logic functions to perform the following control: such as wireless resource control, wireless bearer control, mobility management, admission control and schedule. The control may be implemented in conjunction with a eNB or a core network node nearby. The memory 1022 includes an RAM and an ROM and stores programs performed by the controller 1021 and various types of control data (such as a terminal list, transmission power data and schedule data).

The network interface 1023 is a communication interface connecting a base station device 1020 to a core network 1024. The controller 1021 may communicate with a core network node or another eNB via the network interface 1023. In this case, the eNB 1000 may be connected to the core network node or other eNB via a logic interface (such as an S1 interface and an X2 interface). The network interface 1023 may also be a wired communication interface or a wireless communication interface for a wireless backhaul line. If the network interface 1023 is a wireless communication interface, the network interface 1023 may use a higher frequency band for wireless communication as compared with a frequency band used by the wireless communication interface 1025.

The wireless communication interface 1025 supports any cellular communication scheme (such as Long Term Evolution and LTE-advanced), and provide wireless connection to a terminal in a cell of the eNB 1000 via an antenna 1010. The wireless communication interface 1025 may generally include a baseband (BB) processor 1026 and an RF circuit 1027. The BB processor 1026 may perform for example encoding/decoding, modulating/demodulating and multiplexing and de-multiplexing and perform various types of signal processing of layers (such as L1, medium access control (MAC), radio link control (RLC) and packet data convergence protocol (PDCP). Instead of a controller 1021, the BB processor 1026 may have a part or all of the logic functions described above. The BB processor 1026 may be a memory storing communication control programs, or a module including a processor configured to perform programs and related circuits. Updating programs may change functions of the BB processor 1026. The module may be a card or a blade inserted to a slot of the base station device 1020. Alternatively, the module may also be a chip installed on the card or the blade. Meanwhile, an RF circuit 1027 may include for example a mixer, a filter and an amplifier, and transmits and receives a wireless signal via the antenna 1010.

As shown in FIG. 10, the wireless communication interface 1025 may include multiple BB processors 1026. For example, the multiple BB processors 1026 may be compatible with multiple frequency bands used by the eNB 1000. As shown in FIG. 10, the wireless communication interface 1025 may include multiple RF circuits 1027. For example, the multiple RF circuits 1027 may be compatible with multiple antenna elements. Although FIG. 10 shows an example in which the wireless communication interface 1025 includes multiple BB processors 1026 and multiple RF circuits 1027, the wireless communication interface 1025 may include a single BB processor or a single RF circuit 1027.

Figure 11:
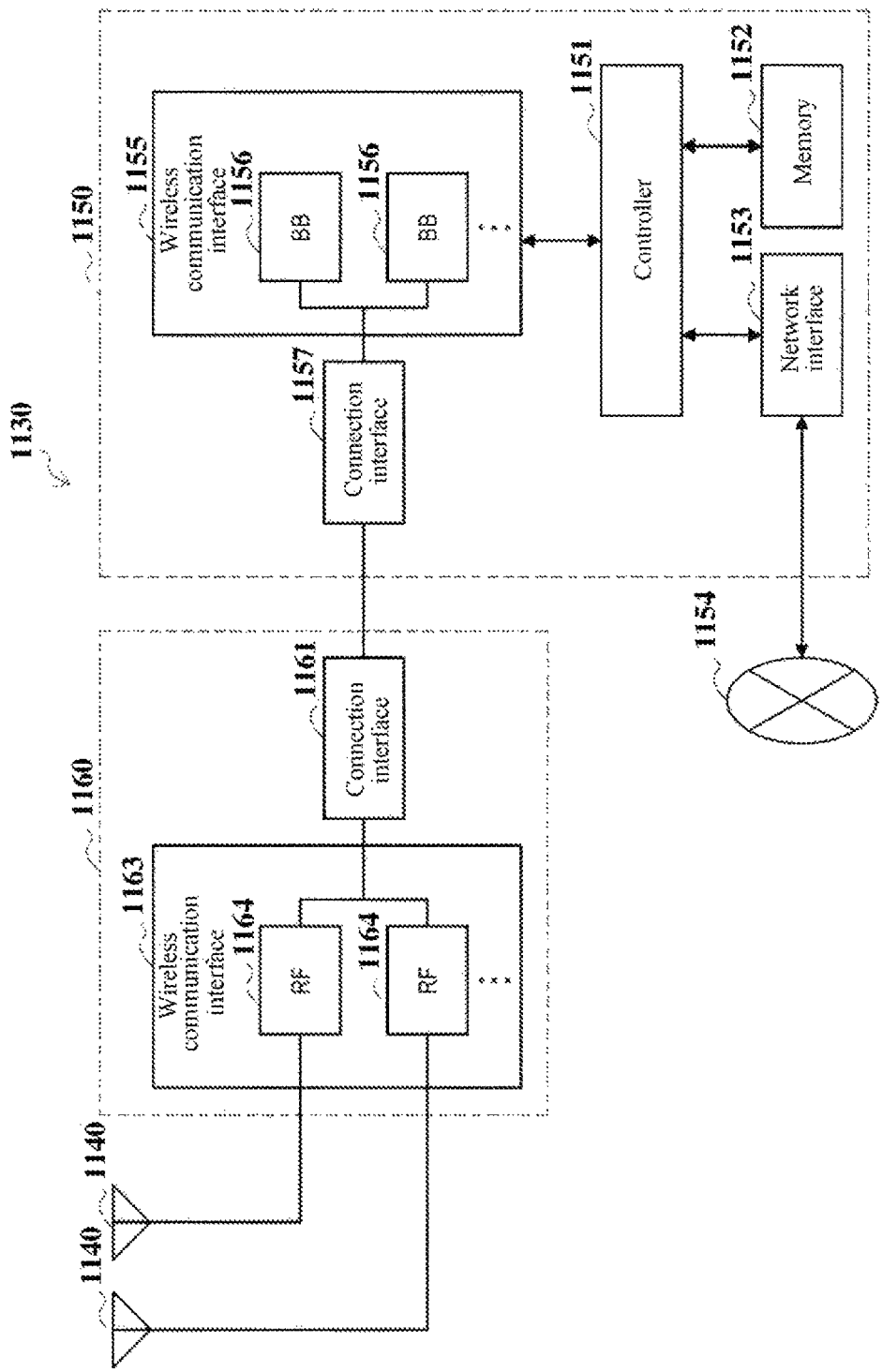
FIG. 11 is a block diagram showing a second example of the schematic configuration of the eNB which adapts to the present disclosure.

FIG. 11 is a block diagram showing a second example of the schematic configuration of the eNB to which the technology of the present disclosure may be applied. An eNB 1130 includes one or more antennas 1140, a base station device 1150 and an RRH 1160. The RRH 1160 and each antenna 1140 may be connected to each other via an RF cable. The base station device 1150 and the RRH 1160 may be connected to each other via a high speed line such as an optical fiber cable.

Each of the antennas 1140 includes a single or multiple antenna elements (such as multiple antenna elements included in the MIMO antenna) and is used for the RRH 1160 to transmit and receive a wireless signal. As shown in FIG. 11, the eNB 1130 may include multiple antennas 1140. For example, the multiple antennas 1140 may be compatible with multiple frequency bands used by the eNB 1130.

Although FIG. 11 shows an example in which the eNB 1130 includes multiple antennas 1140, the eNB 1130 may include a single antenna 1140.

The base station device 1150 includes a controller 1151, a memory 1152, a network interface 1153, a wireless communication interface 1155 and a connection interface 1157. The controller 1151, the memory 1152 and the network interface 1153 are the same as the controller 1021, the memory 1022 and the network interface 1023 described with reference to FIG. 10.

A wireless communication interface 1155 supports any cellular communication scheme (such as LTE and LTE-advanced), and provide wireless communication with a terminal in a sector corresponding to the RRH 1160 via the RRH 1160 and the antenna 1140. The wireless communication interface 1155 may generally include a BB processor 1156 for example. In addition to that the BB processor 1156 is connected to an RF circuit 1164 of the RRH 1160 via the connection interface 1157, the BB processor 1156 is the same as the BB processor 1026 described with reference to FIG. 10. As shown in FIG. 11, the wireless communication interface 1155 may include multiple BB processors 1156. For example, the multiple BB processors 1156 may be compatible with multiple frequency bands used by the eNB 1130. Although FIG. 11 shows an example in which the wireless communication interface 1155 includes multiple BB processors 1156, the wireless communication interface 1155 may include a single BB processor 1156.

The connection interface 1157 is an interface configured to connect the base station device 1150 (the wireless communication interface 1155) to the RRH 1160. The connection interface 1157 may be a communication module for communication in the high speed line described above which connects the base station device 1150 (the wireless communication interface 1155) to the RRH 1160.

The RRH 1160 includes a connection interface 1161 and a wireless communication interface 1163.

The connection interface 1161 is an interface configured to connect the RRH 1160 (the wireless communication interface 1163) to the base station device 1150. The connection interface 1161 may be a communication module for performing communication via the high speed line described above.

The wireless communication interface 1163 transmits and receives a wireless signal via the antenna 1140. The wireless communication interface 1163 may generally include an RF circuit 1164 for example. The RF circuit 1164 may include for example a mixer, a filter and an amplifier, and transmits and receives a wireless signal via the antenna 1140. As shown in FIG. 11, the wireless communication interface 1163 may include multiple RF circuits 1164. For example, the multiple RF circuits 1164 may support multiple antenna elements. Although FIG. 11 shows an example in which the wireless communication interface 1163 includes multiple RF circuits 1164, the wireless communication interface 1163 may include a single RF circuit 1164.

In the eNB 1000 and the eNB 1130 shown in FIG. 10 and FIG. 11, the communication unit 220 described in FIG. 2 and the communication unit 320 described in FIG. 3 may be implemented by the wireless communication interface 1025 and the wireless communication interface 1155 and/or the wireless communication interface 1163. At least a part of the functions may be implemented by a controller 1021 and a controller 1151.

Figure 12:
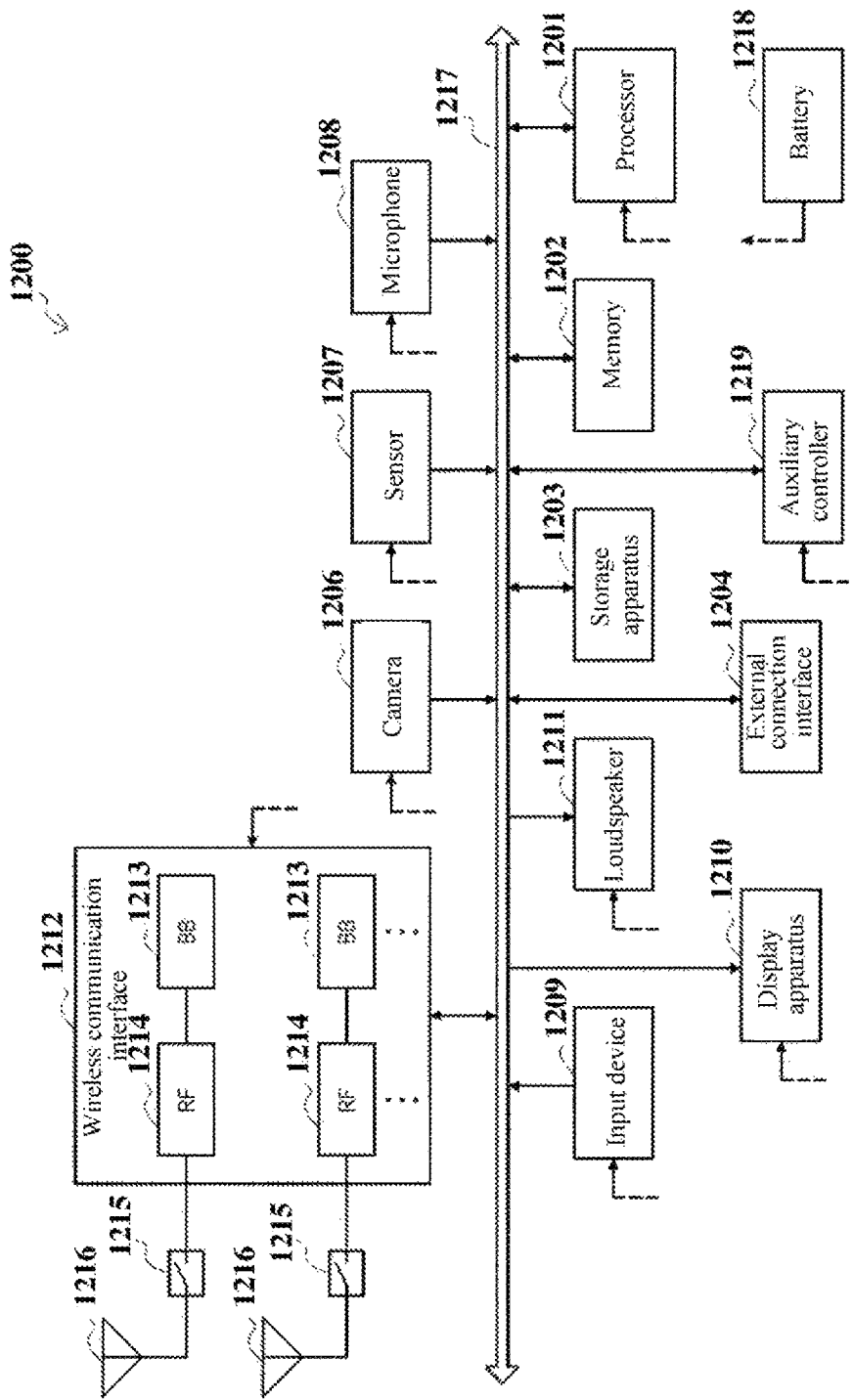
FIG. 12 is a block diagram showing an example of a schematic configuration of a smart phone which adapts to the present disclosure.

FIG. 12 is a block diagram showing an example of a schematic configuration of a smart phone 1200 to which the technology of the present disclosure may be applied. The smart phone 1200 includes: a processor 1201, a memory 1202, a storage apparatus 1203, an external connection interface 1204, a camera 1206, a sensor 1207, a microphone 1208, an input apparatus 1209, a display apparatus 1210, a loudspeaker 1211, a wireless communication interface 1212, one or more antenna switches 1215, one or more antennas 1216, a bus 1217, a battery 1218 and an auxiliary controller 1219.

The processor 1201 may be for example a CPU or a system on chip (SoC), and control functions of an application layer and other layers of the smart phone 1200. The memory 1202 includes an RAM and an ROM, and stores programs executed by the processor 1201 and data. The storage apparatus 1203 may include a storage medium, such as a semiconductor memory and a hard disk. The external connection interface 1204 is an interface configured to connect an external apparatus (such as a memory card and a universal serial bus (USB) device) to the smart phone 1200.

The camera 1206 includes an image sensor (such as a charge coupled device (CCD) and a complementary metal oxide semiconductor (CMOS)) and generates a capturing image. The sensor 1207 may include a set of sensors, such as a measurement sensor, a gyroscope sensor, a geomagnetic sensor and an acceleration sensor. The microphone 1208 converts sound inputted into the smart phone 1200 into an audio signal. The input apparatus 1209 includes for example a touch sensor configured to detect touch on a screen of the display apparatus 1210, a keypad, a keyboard, a button or a switch, and receives an operation or information inputted from a user. The display apparatus 1210 includes a screen (such as a liquid crystal display (LCD) and an organic light emitting diode (OLED) display), and displays an output image of the smart phone 1200. The loudspeaker 1211 converts the audio signal outputted from the smart phone 1200 into sound.

The wireless communication interface 1212 supports any cellular communication scheme (such as LTE and LTE-advanced), and performs wireless communication. The wireless communication interface 1212 may generally include for example a BB processor 1213 and an RF circuit 1214. The BB processor 1213 may perform encoding/decoding, modulating/demodulating and multiplexing/de-multiplexing for example, and perform various types of signal processing for wireless communication. Meanwhile, the RF circuit 1214 may include for example a mixer, a filter and an amplifier, and transmits and receives a wireless signal via an antenna 1216. The wireless communication interface 1212 may be a chip module on which a BB processor 1213 and the RF circuit 1214 are integrated. As shown in FIG. 12, the wireless communication interface 1212 may include multiple BB processors 1213 and multiple RF circuits 1214. Although FIG. 12 shows an example in which the wireless communication interface 1212 includes multiple BB processors 1213 and multiple RF circuits 1214, the wireless communication interface 1212 may include a single BB processor 1213 or a single RF circuit 1214.

In addition to the cellular communication scheme, the wireless communication interface 1212 may support other types of wireless communication schemes, such as a short distance wireless communication scheme, a near field communication scheme and a wireless local area network (LAN) scheme. In this case, the wireless communication interface 1212 may include a BB processor 1213 and an RF circuit 1214 for each type of wireless communication scheme.

Each of the wireless switches 1215 switches a connection destination of the antenna 1216 between multiple circuits (for example circuits for different wireless communication schemes) included in the wireless communication interface 1212.

Each of the antennas 1216 includes a single or multiple antenna elements (such as multiple antenna elements included in the MIMO antenna), and is used for the wireless communication interface 1212 to transmit and receive a wireless signal. As shown in FIG. 12, the smart phone 1200 may include multiple antennas 1216. Although FIG. 12 shows an example in which the smart phone 1200 includes multiple antennas 1216, the smart phone 1200 may include a single antenna 1216.

In addition, the smart phone 1200 may include an antenna 1216 for each type of wireless communication scheme. In this case, the antenna switch 1215 may be omitted from the configuration of the smart phone 1200.

The bus 1217 connects the processor 1201, the memory 1202, the storage apparatus 1203, the external connection interface 1204, the camera 1206, the sensor 1207, the microphone 1208, the input apparatus 1209, the display apparatus 1210, the loudspeaker 1211, the wireless communication interface 1212 and the auxiliary controller 1219 with each other. The battery 1218 supplies power for blocks in the smart phone 1200 shown in FIG. 12 via a feeder which is indicated partially as a dashed line in the figure. The auxiliary controller 1219 controls a minimum necessary function of the smart phone 1200 in a sleeping mode, for example.

In the smart phone 1200 shown in FIG. 12, the communication unit 120 described in FIG. 1 may be implemented by the wireless communication interface 1212. At least a part of the functions may be implemented by the processor 1201 or the auxiliary controller 1219.

Figure 13:
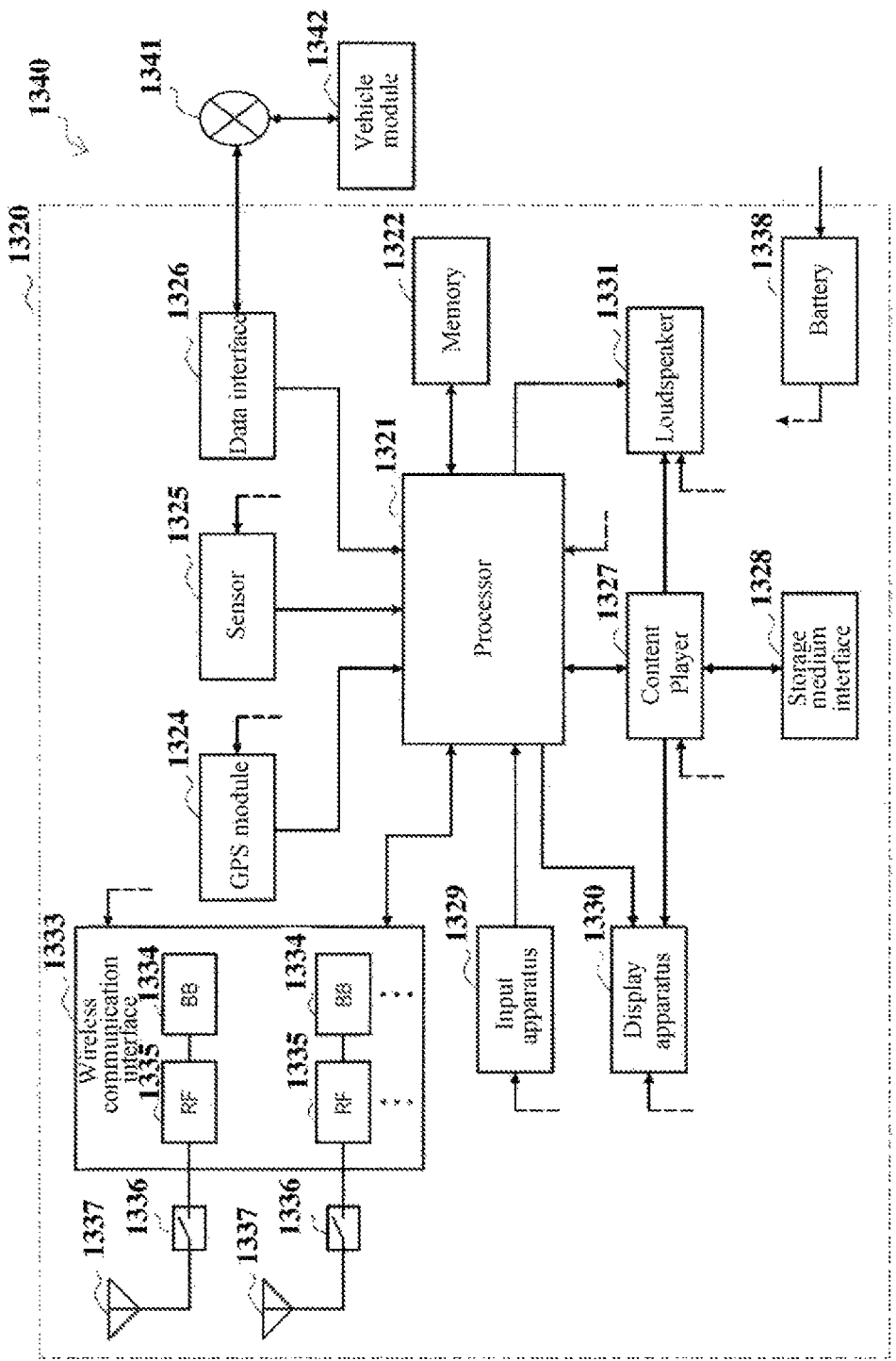
FIG. 13 is a block diagram showing an example of a schematic configuration of an automobile navigation device which adapts to the present disclosure.

FIG. 13 is a block diagram showing an example of a schematic configuration of an automobile navigation device 1320 to which the technology of the present disclosure may be applied. The automobile navigation device 1320 includes a processor 1321, a memory 1322, a global positioning system (GPS) module 1324, a sensor 1325, a data interface 1326, a content player 1327, a storage medium interface 1328, an input apparatus 1329, a display apparatus 1330, a loudspeaker 1331, a wireless communication interface 1333, one or more antenna switches 1336, one or more antennas 1337 and a battery 1338.

The processor 1321 may be a CPU or an SoC, and controls a navigation function and other functions of the automobile navigation device 1320. The memory 1322 includes an RAM and an ROM, and stores programs executed by the processor 1321 and data.

The GPS module 1324 measures a position of the automobile navigation device 1320 (such as a latitude, a longitude and a height) by using a GPS signal received from a GPS satellite. The sensor 1325 may include a set of sensors, such as a gyroscope sensor, a geomagnetic sensor and an air pressure sensor. The data interface 1326 is connected to a vehicle network 1341 for example through a terminal not shown, and acquires data generated by the vehicle (such as vehicle speed data).

The content player 1327 reproduces contents stored in a storage medium (such as a CD and a DVD), and the storage medium is inserted into the storage medium interface 1328. The input apparatus 1329 includes for example a touch sensor configured to detect touch on a screen of the display apparatus 1330, a button or a switch, and receives an operation or information inputted from a user. The display apparatus 1330 includes a screen of an LCD or OLED display for example, and displays an image with a navigation function or the reproduced content. The loudspeaker 1331 outputs a sound with a navigation function or the reproduced content.

The wireless communication interface 1333 supports any cellular communication scheme (such as LTE and LTE-advanced), and performs wireless communication. The wireless communication interface 1333 may generally include a BB processor 1334 and an RF circuit 1335 for example. The BB processor 1334 may perform encoding/decoding, modulating/demodulating and multiplexing/de-multiplexing, and perform various types of signal processing for wireless communication. Meanwhile, the RF circuit 1335 may include for example a mixer, a filer and an amplifier, and transmits and receives a wireless signal via the antenna 1337. The wireless communication interface 1333 may also be a chip module on which the BB processor 1334 and the RF circuit 1335 are integrated. As shown in FIG. 13, the wireless communication interface 1333 may include multiple BB processors 1334 and multiple RF circuits 1335. Although FIG. 13 shows an example in which the wireless communication interface 1333 includes multiple BB processors 1334 and multiple RF circuits 1335, the wireless communication interface 1333 may include a single BB processor 1334 or a single RF circuit 1335.

In addition to the cellular communication scheme, the wireless communication interface 1333 may support other types of wireless communication schemes, such as a short distance wireless communication scheme, a near field communication scheme and a wireless LAN scheme. In this case, for each type of wireless communication scheme, the wireless communication interface 1333 may include the BB processor 1334 and the RF circuit 1335.

Each of the antenna switches 1336 switches a connection destination of the antenna 1337 between multiple circuits (such as circuits for different wireless communication schemes) included in the wireless communication interface 1333.

Each of the antennas 1337 includes a single or multiple antenna elements (such as multiple antenna elements included in the MIMO antenna), and is used for the wireless communication interface 1333 to transmit and receive a wireless signal. As shown in FIG. 13, the automobile navigation device 1320 may include multiple antennas 1337. Although FIG. 13 shows an example in which the automobile navigation device 1320 includes multiple antennas 1337, the automobile navigation device 1320 may include a single antenna 1337.

In addition, the automobile navigation device 1320 may include the antenna 1337 for each type of wireless communication scheme. In this case, the antenna switch 1336 may be omitted from the configuration of the automobile navigation device 1320.

The battery 1338 supplies power for blocks in the automobile navigation device 1320 shown in FIG. 13 via a feeder which is indicated partially as a dashed line in the figure. The battery 1338 accumulates power provided by the vehicle.

In the automobile navigation device 1320 shown in FIG. 13, the communication unit 120 described in FIG. 1 may be implemented by the wireless communication interface 1333. At least a part of the functions may be implemented by the processor 1321.

The technology of the present disclosure may be implemented as a vehicle-mounted system (or a vehicle) 1340 including one or more of the automobile navigation device 1320, the vehicle network 1341 and a vehicle module 1342. The vehicle module 1342 generates vehicle data (such as a vehicle speed, an engine speed and fault information), and outputs the generated data to the vehicle network 1341.

In the system and method according to the present disclosure, obviously, components or steps may be decomposed and/or recombined. The decomposition and/or recombination should be regarded as equivalent solutions of the present disclosure. In addition, steps in the series of processing described above may be performed naturally in an order of description and in a time order, and is not necessarily performed in the time order. Some steps may be performed in parallel or independently from each other.

Although the embodiments of the present disclosure are described in detail in conjunction with the drawings above, it should be understood that the embodiments described above are only used to illustrate the present disclosure and are not intended to limit the present disclosure. For those skilled in the art, various types of changes and modifications may be made to the embodiments without departing from the essence and scope of the present disclosure. Therefore, the scope of the present disclosure is defined by only the appended claims and equivalent meaning thereof.

The invention claimed is:

1. An electronic device at a user equipment side, comprising:
   one or more processing circuits configured to perform operations of:
   determining positioning measurement auxiliary data for the user equipment, the positioning measurement auxiliary data including configuration information of an enhanced discovery reference signal (eDRS) transmitted by at least one sleeping small cell base station;
   performing positioning measurement on the eDRS transmitted by the at least one sleeping small cell base station and reference signals transmitted by two other cell base stations based on the positioning measurement auxiliary data and calculating a reference signal time difference (RSTD); and
   generating positioning information based on a result of the positioning measurement performed on the eDRS transmitted by the at least one sleeping small cell base station to perform positioning on the user equipment and the calculated RSTD,
   wherein the eDRS has a greater transmission power than a discovery reference signal (DRS); and
   wherein the eDRS is different than a positioning reference signal (PRS).

2. The electronic device according to claim 1, wherein the positioning measurement auxiliary data includes configuration information of the eDRS transmitted by the at least one sleeping small cell base station and configuration information of the reference signals for positioning measurement transmitted by the two other cell base stations.

3. The electronic device according to claim 2, wherein among the two other cell base stations and the at least one sleeping small cell base station, one is a positioning reference cell base station, and remaining two are neighboring cell base stations participating in the positioning measurement, and the one or more processing circuits are configured to read offset information between reference signals of the neighboring cell base stations and a reference signal of the reference cell base station in the positioning measurement auxiliary data, and perform the positioning measurement based on the offset information.

4. The electronic device according to claim 2, wherein at least one of the two other cell base stations is an active cell base station, a reference signal of which is a PRS, and the one or more processing circuits are configured to calculate the RSTD based on measurements results of the eDRS and the PRS.

5. The electronic device according to claim 4, wherein the configuration information of the eDRS further includes at least one of cell base station identifier information, frequency information, antenna port configuration information and cyclic prefix length information of the at least one sleeping small cell base station.

6. The electronic device according to claim 1, wherein the configuration information of the eDRS includes at least one of a power configuration, a bandwidth, a period, a time offset and silent information of the eDRS, and the period of the eDRS is an integral multiple of a period of the DRS which is greater than 1.

7. The electronic device according to claim 1, wherein the one or more processing circuits are further configured to perform radio resource management measurement on the DRS in a radio environment where the user equipment is located to discover a neighboring sleeping small cell base station, and wherein the one or more processing circuits are configured to identify the eDRS based on a measurement signal intensity and correct the discovery of the neighboring sleeping small cell base station in response to the identification of the eDRS.

8. The electronic device according to claim 7, wherein the correcting the discovery of the neighboring sleeping small cell base station includes: when determining a result of the radio resource management measurement,
   neglecting the eDRS;
   replacing the eDRS with a neighboring discovery reference signal DRS prior to the eDRS; or
   subtracting, from a receiving power of the eDRS, a difference between transmission powers of the eDRS and the DRS.

9. The electronic device according to claim 1, wherein the electronic device is the user equipment, and further comprises a transceiver configured to receive the positioning measurement auxiliary data from a network device via an air interface and transmit the positioning information to the network device.

* * * * *